US011836980B2

(12) United States Patent
Reyes et al.

(10) Patent No.: US 11,836,980 B2
(45) Date of Patent: *Dec. 5, 2023

(54) SYSTEMS, DEVICES, AND METHODS FOR ASSISTING HUMAN-TO-HUMAN INTERACTIONS

(71) Applicant: GOOGLE LLC, Mountain View, CA (US)

(72) Inventors: Gabriel Reyes, Dexter, MI (US); Daniel Perry, Waterloo (CA); Samarth Singhal, Kitchener (CA); Evangelos Niforatos, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,550

(22) Filed: Jun. 21, 2022

(65) Prior Publication Data

US 2022/0335716 A1    Oct. 20, 2022

Related U.S. Application Data

(63) Continuation of application No. 16/713,828, filed on Dec. 13, 2019, now Pat. No. 11,373,402.

(60) Provisional application No. 62/782,921, filed on Dec. 20, 2018.

(51) Int. Cl.
*G06V 20/20* (2022.01)
*G06F 1/16* (2006.01)
*G06F 3/01* (2006.01)
*G06V 40/16* (2022.01)
*G02B 27/01* (2006.01)
*H04L 12/18* (2006.01)

(52) U.S. Cl.
CPC .......... *G06V 20/20* (2022.01); *G02B 27/017* (2013.01); *G06F 1/163* (2013.01); *G06F 3/013* (2013.01); *G06V 40/174* (2022.01); *H04L 12/1822* (2013.01)

(58) Field of Classification Search
CPC .... G06V 20/20; G06V 40/174; G02B 27/017; G06F 1/163; G06F 3/013; H04L 12/1822
See application file for complete search history.

(56) References Cited

U.S. PATENT DOCUMENTS

2013/0281206 A1* 10/2013 Lyons ................. G07F 17/323
                                                                 463/33
2018/0293986 A1* 10/2018 Musham ............... G10L 15/26

* cited by examiner

*Primary Examiner* — David Bilodeau

(57) ABSTRACT

Systems, devices, and methods for providing assistance in human-to-human interactions are described. When it is determined that a user of a wearable heads-up display is interacting with another human, interaction assistance information can be presented to the user, such as biographic information relating to the other human, indication of emotional states of the user and/or other human, indication of when the interaction is one-sided, candidate conversation topics and candidate conversation questions. Additionally, interaction assistance functions or applications can also be provided which enable recording and storing of interactions, generation of summaries or lists based on the interaction, transcription of the interaction, note taking, event input, and notification management.

20 Claims, 31 Drawing Sheets

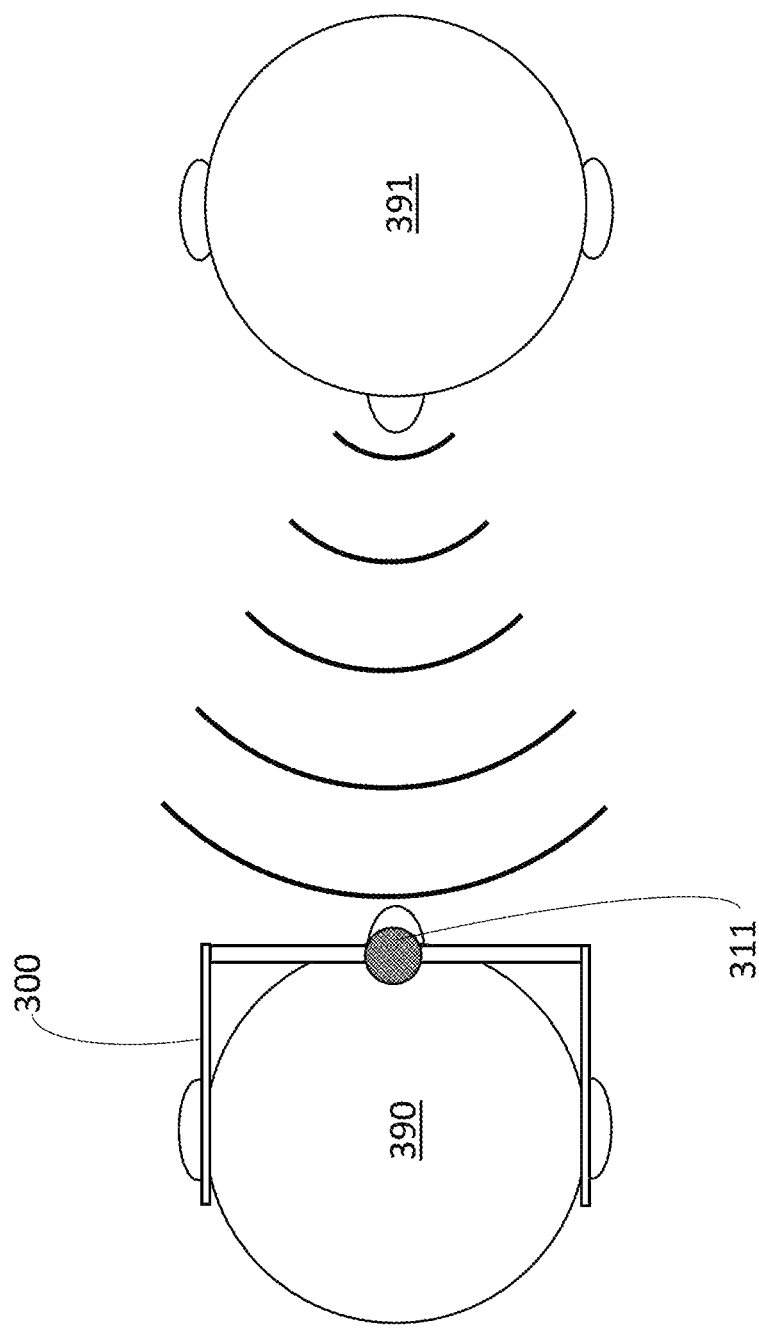

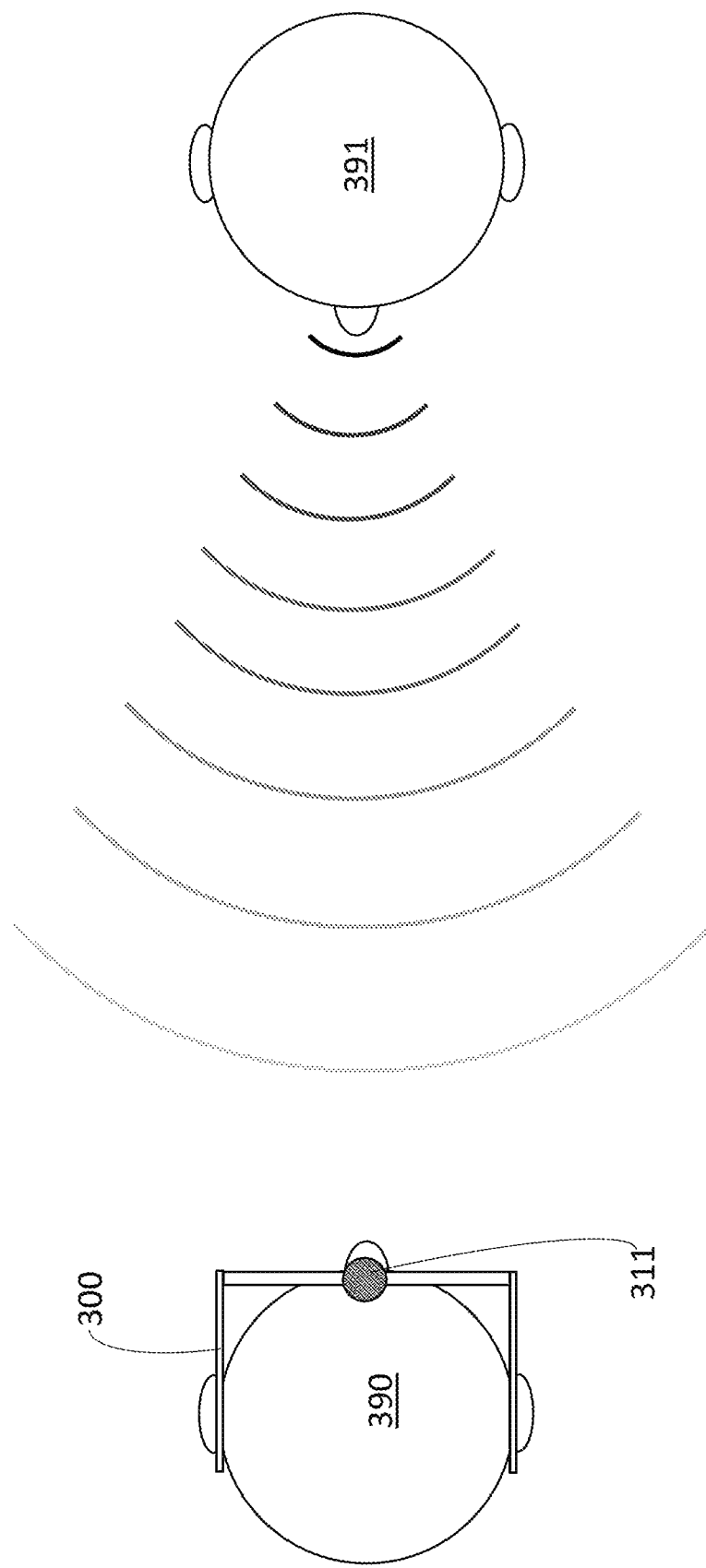

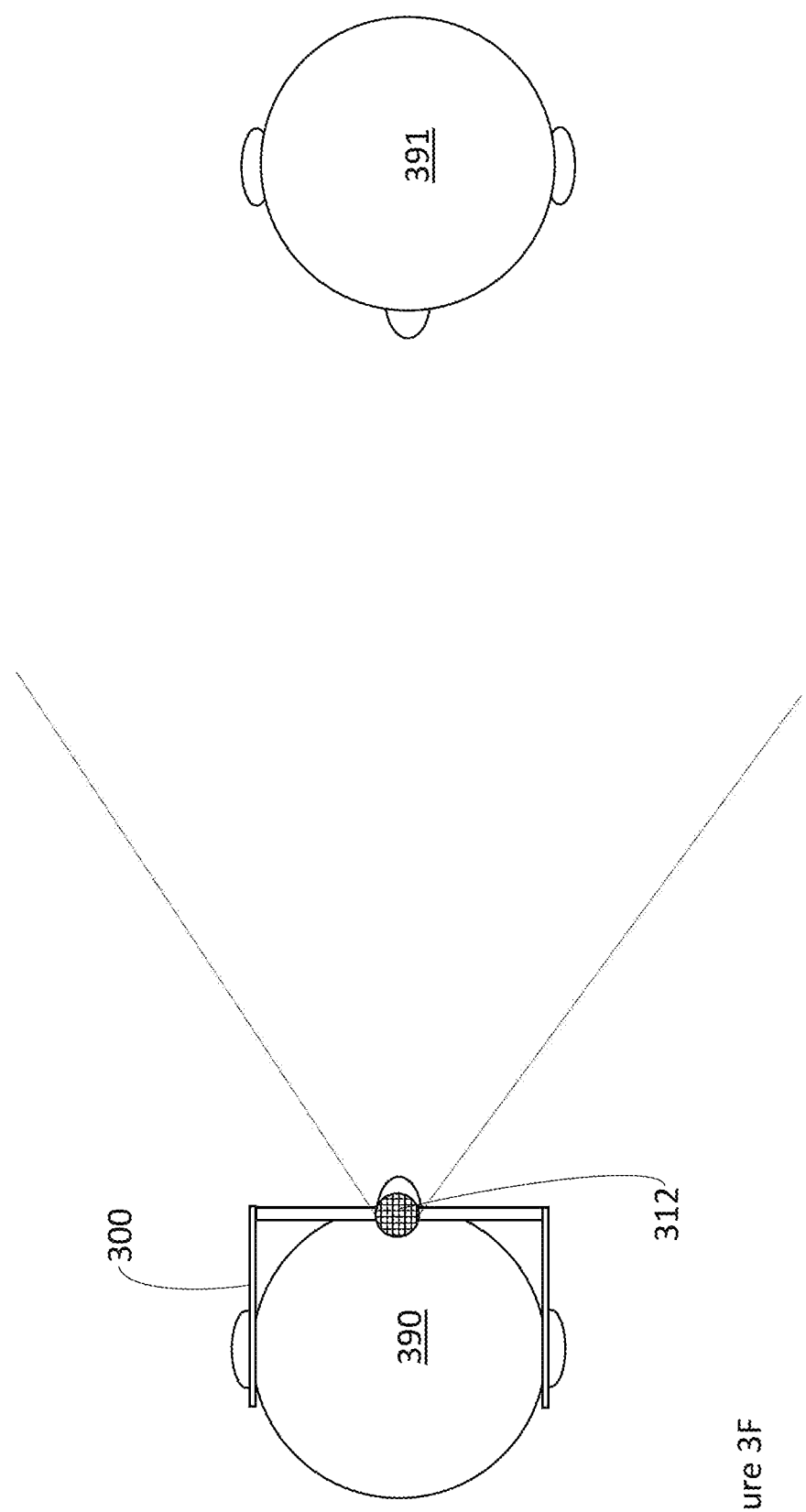

| 370 | Sunday | Monday | Tuesday | Wednesday | Thursday | Friday | Saturday |
|---|---|---|---|---|---|---|---|
| 9:00 AM - 12:00 PM | Picnic with Family | | | | | Company -wide meeting | |
| 12:00 PM - 3:00 PM | | 1 on 1 with Boss | | | | | |
| 3:00 PM - 6:00 PM | | | | | | | |
| 6:00 PM - 9:00 PM | | | Relaxing time alone | | Potluck dinner | | |

This person is very angry, try to avoid saying anything controversial or offensive. Maybe try to leave the conversation quickly so they can calm down.

101

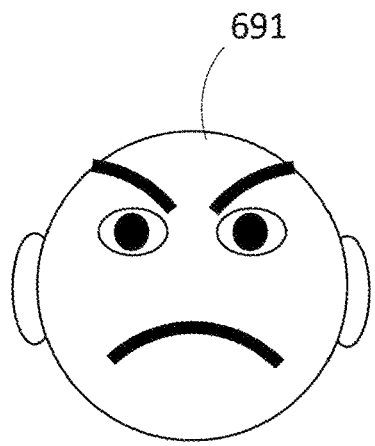
Figure 6C
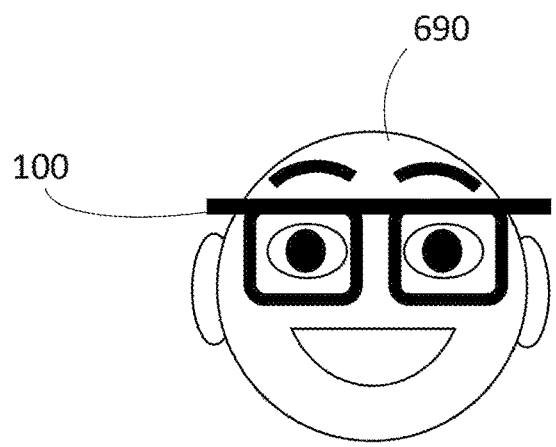
Figure 6D
This person is very angry, but you are acting very happy and jovial. The other person may interpret this as you mocking their feelings. It may be helpful to calm down and show them that you are taking their feelings seriously.
Figure 6E You're dominating the conversation. Try asking the other person a question. For example:

-What about you? Have you ever eaten the bowl?
-How are your kids?
-What did you do this weekend?

Conversation topics:

-How is work going?
-Summer is coming soon
-What did you have for lunch?

Here's a summary of the key points discussed:

-Project deadline has been delayed one week
-Client wants a itemized bill of expenses
-A new employee will be training under you starting next week

Grocery list:

-Lemons
-Limes
-Salt
-Vitamins

The other person is saying:

So with regards to the current project, I want you and Jack to prepare a timeline for the next three months ...

SYSTEMS, DEVICES, AND METHODS FOR ASSISTING HUMAN-TO-HUMAN INTERACTIONS

CROSS-REFERENCE TO RELATED APPLICATIONS

The present application is a continuation application of U.S. patent application Ser. No. 16/713,828, entitled "SYSTEMS, DEVICES, AND METHODS FOR ASSISTING HUMAN-TO-HUMAN INTERACTIONS" and filed on Dec. 13, 2019, which claims priority to U.S. Provisional Application Ser. No. 62/782,921, entitled "SYSTEMS, DEVICES, AND METHODS FOR ASSISTING HUMAN-TO-HUMAN INTERACTIONS" and filed on Dec. 20, 2018, the entirety of which is incorporated by reference herein.

TECHNICAL FIELD

The present systems, devices, and methods generally relate to providing assistance in human-to-human interactions, and particularly relate to presenting or modifying user interfaces in a wearable heads-up display to assist a user in interacting with other humans.

BACKGROUND

Description of the Related Art

Portable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, earphones may be considered a portable electronic device whether they are operated wirelessly or through a wire connection.

The convenience afforded by the portability of electronic devices has fostered a huge industry. Smartphones, audio players, laptop computers, tablet computers, and ebook readers are all examples of portable electronic devices. Further portable electronic devices enable us to be continuously connected to other's in the world through communication networks such as the Internet or cellular communication networks. This makes it easier for users to connect and interact with other remote users.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

Human-to-Human Interaction

Humans frequently interact with each other directly, face-to-face, using verbal communication, as well as non-verbal communication like body language and facial expressions. There are many challenges humans face when interacting with another human, including at least remembering the other human's name and other relevant information, accurately identifying the other human's emotions and thoughts so as to appropriately respond, and remembering what was said after the interaction is over, among many other challenges. Further, many, if not most, humans struggle with at least one aspect of human-to-human interactions, and many humans struggles with many aspects of human-to-human interactions. For example, some people have significantly difficulty remembering the names of new people they meet, which can negatively impact their ability to form relationships with new people. As another example, some people have significant social anxiety, and struggle to find appropriate topics to discuss with other humans. As another example, some people may have difficulty understanding subtle interaction cues like body language and facial expression, and consequently may have difficulty interacting with other people in ways that ensure that all participants in the interaction feel comfortable. Thus, it is desirable to have means for providing interaction assistance to users to optimize their human-to-human interactions.

BRIEF SUMMARY

According to a broad aspect, the description describes a processor-based method of assisting human-to-human interactions using a system, wherein the system may include at least one processor, a display communicatively coupled to the at least one processor, a non-transitory processor-readable medium communicatively coupled to the at least one processor, and at least one user context sensor communicatively coupled to the at least one processor, wherein the non-transitory processor-readable medium may store processor-executable instructions that, when executed by the at least one processor, cause the system to perform the method, the method including: receiving, by the at least one processor, user context data from the at least one user context sensor; and determining, by the at least one processor, that a user of the system is interacting with another human based on the user context data; after determining, by the at least one processor, that the user is interacting with another human, providing, by the system, interaction assistance to the user.

Receiving, by the at least one processor, user context data from the at least one user context sensor may include at least one of: receiving, by the at least one processor, captured audio data from a microphone included in the at least one user context sensor; receiving, by the at least one processor, captured visual data from a camera included in the at least one user context sensor; receiving, by the at least one processor, captured user eye data from a user eye-tracking system included in the at least one user context sensor; and receiving, by the at least one processor, captured user motion data from an inertial measurement unit included in the at least one user context sensor.

The at least one user context sensor may include at least one microphone; receiving, by the at least one processor, user context data from the at least one user context sensor may include receiving, by the at least one processor, captured audio data from the at least one microphone; and determining, by the at least one processor, that a user of the system is interacting with another human based on the user context data may include: analyzing, by the at least one processor, at least one of a volume of the captured audio data, a source direction associated with the captured audio data, a source proximity associated with the captured audio data, a frequency spectrum of the captured audio data, emotion of a human represented in the captured audio data, or content of the captured audio data; and determining, by the at least one processor, that a user of the system is interacting with another human based on one or a combination of the volume of the captured audio data, the source direction associated with the captured audio data, the source proximity associated with the captured audio data, the frequency spectrum of the captured audio data, the emotion of a human represented in the captured audio data, or the content of the captured audio data.

The at least one user context sensor may include at least one camera; receiving, by the at least one processor, user context data from the at least one user context sensor may include receiving, by the at least one processor, captured visual data from the at least one camera; and determining, by the at least one processor, that a user of the system is interacting with another human based on the user context data may include: determining, by the at least one processor, that another human is represented in the captured visual data; identifying, by the at least one processor, at least one of a proximity of the other human to the user, a gaze direction of the other human, a facial expression of the other human, or movement patterns of the other human based on the captured visual data; and determining, by the at least one processor, that a user of the system is interacting with the other human based on one or a combination of the proximity of the other human to the user, the gaze direction of the other human, the facial expression of the other human, or the movement patterns of the other human.

The at least one user context sensor may include at least one inertial measurement unit; receiving, by the at least one processor, user context data from the at least one user context sensor may include receiving, by the at least one processor, captured user motion data from the at least one inertial measurement unit; and determining, by the at least one processor, that a user of the system is interacting with another human based on the user context data may include: analyzing, by the at least one processor, at least one of head motions made by the user, head position of the user, head angle of the user, and body motions made by the user based on the captured user motion data; and determining, by the at least one processor, that a user of the system is interacting with the other human based on one or a combination of at least one of the head motions made by the user, the head position of the user, the head angle of the user, and the body motions made by the user based on the captured user motion data.

The at least one user context sensor may include a user eye-tracking system; receiving, by the at least one processor, user context data from the at least one user context sensor may include receiving, by the at least one processor, captured user eye data from the user eye-tracking system; and determining, by the at least one processor, that a user of the system is interacting with another human based on the user context data may include: analyzing, by the at least one processor, at least one of a blink frequency of the user, gaze direction of the user, movement patterns of at least one of the user's eyes, movement patterns of at least one of the user's eyelids, a facial expression of the user, and iris dilation patterns of at least one of the user's eyes based on the captured user eye data; and determining, by the at least one processor, that a user of the system is interacting with the other human based on one or a combination of the blink frequency of the user, the gaze direction of the user, the movement patterns of at least one of the user's eyes, the movement patterns of at least one of the user's eyelids, the facial expression of the user, and the iris dilation patterns of at least one of the user's eyes based on the captured user eye data.

Receiving, by the at least one processor, user context data from the at least one user context sensor may include at least two of: receiving, by the at least one processor, captured audio data from a microphone included in the at least one user context sensor; receiving, by the at least one processor, captured visual data from a camera included in the at least one user context sensor; receiving, by the at least one processor, captured user eye data from a user eye-tracking system included in the at least one user context sensor; and receiving, by the at least one processor, captured user motion data from an inertial measurement unit included in the at least one user context sensor.

The processor-based method may further include continuously capturing, by the at least one user context sensor, the user context data. The processor-based method may further include periodically capturing, by the at least one user context sensor, the user context data as intermittent user context data samples. The processor-based method may further include: receiving, by the at least one processor, a user input to operate the system; and capturing, by the at least one user context sensor, the user context data only after receiving, by the at least one processor, the user input to operate the system.

The processor-based method may further include determining, by the at least one processor, an identity of the other human based on the user context data, and presenting, by the system, interaction assistance to the user may include presenting, by the system to the user, at least one of a name of the other human, a job title of the other human, a name of at least one organization or group which the other human is a member of, a work field of the other human, a research field of the other human, a description of the relationship between the user and the other human, an age of the other human, interests of the other human, or marital status of the other human.

The processor-based method may further include, after determining by the at least one processor that the user is interacting with another human, determining, by the at least one processor, an emotional state of the other human based on at least a portion of the user context data, and providing, by the system, interaction assistance to the user may include presenting, by the system to the user, information indicating the emotional state of the other human and suggestions to help the user interact with the other human.

The processor-based method may further include, after determining by the at least one processor that the user is interacting with another human: determining, by the at least one processor, an emotional state of the user based on at least a portion of the user context data; determining, by the at least one processor, an emotional state of the other human based on at least a portion of the user context data; and determining, by the at least one processor, a difference between the emotional state of the user and the emotional state of the other human, and providing, by the system, interaction assistance to the user may include presenting, by the system to the user, information indicating the difference between the emotional state of the user and the emotional state of the other human and suggestions to help the user interact with the other human.

The processor-based method may further include, after determining by the at least one processor that the user is interacting with another human: determining, by the at least one processor, a first proportion of time in which the user is talking within a time interval based on at least a portion of the user context data; determining, by the at least one processor, a second proportion of time in which the other human is talking within the time interval based on at least a portion of the user context data; and determining, by the at least one processor, a difference between the proportion of time in which the user is talking and the proportion of time in which the other human is talking, and providing, by the system, interaction assistance to the user may include presenting, by the system, a notification to the user based on the difference between the proportion of time in which the user is talking and the proportion of time in which the other human is talking. Presenting, by the system, a notification to the user based on the difference between the proportion of time in which the user is talking and the proportion of time in which the other human is talking may include presenting, by the system, candidate questions for the user to ask the other human. Providing, by the system, interaction assistance to the user may include presenting, by the system, candidate conversation topics to the user.

The processor-based method may further include: before determining by the at least one processor that the user is interacting with another human, displaying, by the display, a user interface to the user at a first position; and after determining by the at least one processor that the user is interacting with another human, displaying, by the display, the user interface at a second position different from the first position.

Providing, by the system, interaction assistance to the user may include capturing, by at least one user context sensor of the system, a recording of the interaction. Providing, by the system, interaction assistance to the user may further include presenting, by the system to the user, a user interface option to store the recording of the interaction. Providing, by the system, interaction assistance to the user may further include presenting, by the system to the user, a user interface option to transmit the recording of the interaction. Capturing, by at least one user context sensor of the system, a recording of the interaction may include continuously capturing a buffer recording of a portion of the interaction; and providing, by the system, interaction assistance to the user may further include presenting, by the system to the user, a user interface option to store the buffer recording of the interaction.

Providing, by the system, interaction assistance to the user may further include generating, by the at least one processor, a summary of the interaction based on the user context data from the at least one user context sensor. Providing, by the system, interaction assistance to the user may include presenting, by the system to the user, a user interface for taking notes. Presenting, by the system to the user, a user interface for taking notes may include presenting, by the system to the user, a user interface to enable capturing of voice notes from the user by at least one microphone of the system.

The processor-based method may further include, while the user is interacting with the other human: receiving, by the at least one processor, content of at least two notifications to be presented to the user; generating, by the at least one processor, a list of notifications for the user based on the at least two notifications, the list of notifications to be presented to the user after the user is no longer interacting with the other human.

According to a broad aspect, the description describes a system for assisting human-to-human interactions, wherein the system may include: at least one processor; a display communicatively coupled to the at least one processor; at least one user context sensor communicatively coupled to the at least one processor; a non-transitory processor-readable medium communicatively coupled to the at least one processor, wherein the non-transitory processor-readable medium may store processor-executable instructions that, when executed by the at least one processor, cause the system to: receive, by the at least one processor, user context data from the at least one user context sensor; determine, by the at least one processor, that a user of the system is interacting with another human based on the user context data; and after determining, by the at least one processor, that the user is interacting with another human, providing, by the system, interaction assistance to the user.

The processor-executable instructions which cause the at least one processor to receive user context data from the at least one user context sensor may cause the at least one processor to receive at least one of: captured audio data from a microphone included in the at least one user context sensor; captured visual data from a camera included in the at least one user context sensor; captured user eye data from a user eye-tracking system included in the at least one user context sensor; and captured user motion data from an inertial measurement unit included in the at least one user context sensor.

The at least one user context sensor may include at least one microphone, wherein: the processor-executable instructions which cause the at least one processor to receive user context data from the at least one user context sensor may cause the at least one processor to receive captured audio data from the at least one microphone; and the processor-executable instructions which cause the at least one processor to determine that a user of the system is interacting with another human based on the user context data may cause the at least one processor to: analyze at least one of a volume of the captured audio data, a source direction associated with the captured audio data, a source proximity associated with the captured audio data, a frequency spectrum of the captured audio data, emotion of a human represented in the captured audio data, or content of the captured audio data; and determine that a user of the system is interacting with another human based on one or a combination of the volume of the captured audio data, the source direction associated with the captured audio data, the source proximity associated with the captured audio data, the frequency spectrum of the captured audio data, the emotion of a human represented in the captured audio data, or the content of the captured audio data.

The at least one user context sensor may include at least one camera, wherein: the processor-executable instructions which cause the at least one processor to receive user context data from the at least one user context sensor may cause the at least one processor to receive captured visual data from the at least one camera; and the processor-executable instructions which cause the at least one processor to determine that a user of the system is interacting with another human based on the user context data may cause the at least one processor to: determine that another human is represented in the captured visual data; identify at least one of a proximity of the other human to the user, a gaze direction of the other human, a facial expression of the other human, or movement patterns of the other human based on the captured visual data; and determine that a user of the system is interacting with the other human based on one or a combination of the proximity of the other human to the user, the gaze direction of the other human, the facial expression of the other human, or the movement patterns of the other human.

The at least one user context sensor may include at least one inertial measurement unit, wherein: the processor-executable instructions which cause the at least one processor to receive user context data from the at least one user context sensor may cause the at least one processor to receive captured user motion data from the at least one inertial measurement unit; and the processor-executable instructions which cause the at least one processor to determine that a user of the system is interacting with another human based on the user context data may cause the at least one processor to: analyze at least one of head motions made by the user, head position of the user, head angle of the user, and body motions made by the user based on the captured user motion data; and determine that a user of the system is interacting with the other human based on one or a combination of at least one of the head motions made by the user, the head position of the user, the head angle of the user, and the body motions made by the user based on the captured user motion data.

The at least one user context sensor may include a user eye-tracking system, wherein: the processor-executable instructions which cause the at least one processor to receive user context data from the at least one user context sensor may cause the at least one processor to receive captured user eye data from the user eye-tracking system; and the processor-executable instructions which cause the at least one processor to determine that a user of the system is interacting with another human based on the user context data may cause the at least one processor to: analyze at least one of a blink frequency of the user, gaze direction of the user, movement patterns of at least one of the user's eyes, movement patterns of at least one of the user's eyelids, a facial expression of the user, and iris dilation patterns of at least one of the user's eyes based on the captured user eye data; and determine that a user of the system is interacting with the other human based on one or a combination of the blink frequency of the user, the gaze direction of the user, the movement patterns of at least one of the user's eyes, the movement patterns of at least one of the user's eyelids, the facial expression of the user, and the iris dilation patterns of at least one of the user's eyes based on the captured user eye data.

The processor-executable instructions which cause the at least one processor to receive user context data from the at least one user context sensor may cause the at least one processor to receive at least two of: captured audio data from a microphone included in the at least one user context sensor; captured visual data from a camera included in the at least one user context sensor; captured user eye data from a user eye-tracking system included in the at least one user context sensor; and captured user motion data from an inertial measurement unit included in the at least one user context sensor.

The processor-executable instructions, when executed by the at least one processor may further cause the system to continuously capture, by the at least one user context sensor, the user context data. The processor-executable instructions, when executed by the at least one processor, may further cause the system to periodically capture, by the at least one user context sensor, the user context data as intermittent user context data samples. The processor-executable instructions, when executed by the at least one processor, may further cause the system to: receive, by the at least one processor, a user input to operate the system; and capture, by the at least one user context sensor, the user context data only after receiving, by the at least one processor, the user input to operate the system.

The processor-executable instructions, when executed by the at least one processor, may further cause the system to determine, by the at least one processor, an identity of the other human based on the user context data, and the processor-executable instructions which, when executed by the at least one processor, cause the system to present interaction assistance to the user may cause the system to present at least one of a name of the other human, a job title of the other human, a name of at least one organization or group which the other human is a member of, a work field of the other human, a research field of the other human, a description of the relationship between the user and the other human, an age of the other human, interests of the other human, or marital status of the other human.

The processor-executable instructions, when executed by the at least one processor, may further cause the at least one processor to determine an emotional state of the other human based on at least a portion of the user context data; and the processor-executable instructions which, when executed by the at least one processor cause the system to provide interaction assistance to the user may cause the system to present, to the user, information indicating the emotional state of the other human and suggestions to help the user interact with the other human.

The processor-executable instructions, when executed by the at least one processor, may further cause the at least one processor to: determine an emotional state of the user based on at least a portion of the user context data; determine an emotional state of the other human based on at least a portion of the user context data; and determine a difference between the emotional state of the user and the emotional state of the other human, and the processor-executable instructions which, when executed by the at least one processor, cause the system to provide interaction assistance to the user may cause the system to present to the user information indicating the difference between the emotional state of the user and the emotional state of the other human and suggestions to help the user interact with the other human.

The processor-executable instructions, when executed by the at least one processor, may further cause the at least one processor to: determine a first proportion of time in which the user is talking within a time interval based on at least a portion of the user context data; determine a second proportion of time in which the other human is talking within the time interval based on at least a portion of the user context data; and determine a difference between the proportion of time in which the user is talking and the proportion of time in which the other human is talking, and the processor-executable instructions which, when executed by the at least one processor, cause the system to provide interaction assistance to the user may cause the system to present a notification to the user based on the difference between the proportion of time in which the user is talking and the proportion of time in which the other human is talking. The processor-executable instructions which, when executed by the at least one processor, cause the system to present a notification to the user based on the difference between the proportion of time in which the user is talking and the proportion of time in which the other human is talking may cause the system to present candidate questions to the user for the user to ask the other human. The processor-executable instructions which, when executed by the at least one processor, cause the system to provide interaction assistance to the user may cause the system to present candidate conversation topics to the user.

The processor-executable instructions, when executed by the at least one processor, may further cause the system to: before the at least one processor determines that the user is interacting with another human, display, by the display, a user interface to the user at a first position; after the at least one processor determines that the user is interacting with another human, display, by the display, the user interface at a second position different from the first position.

The processor-executable instructions which, when executed by the at least one processor, cause the system to provide interaction assistance to the user may cause the at least one user context sensor of the system to capture a recording of the interaction. The processor-executable instructions which, when executed by the at least one processor, cause the system to provide interaction assistance to the user may cause the system to present to the user a user interface option to store the recording of the interaction. The processor-executable instructions which, when executed by the at least one processor, cause the system to provide interaction assistance to the user may cause the system to present to the user a user interface option to transmit the recording of the interaction.

The processor executable instructions which, when executed by the at least one processor cause the at least one user context sensor of the system to capture a recording of the interaction may cause the at least one user context sensor to continuously capture a buffer recording of a portion of the interaction; and the processor executable instructions which, when executed by the at least one processor, cause the system to provide interaction assistance to the user may further cause the system to provide to the user a user interface option to store the buffer recording of the interaction.

The processor-executable instructions which, when executed by the at least one processor, cause the system to provide interaction assistance to the user may cause the at least one processor to generate a summary of the interaction based on the user context data from the at least one user context sensor. The processor-executable instructions which, when executed by the at least one processor, cause the system to provide interaction assistance to the user may cause the system to present to the user a user interface for taking notes. The processor-executable instructions which, when executed by the at least one processor, cause the system to present to the user a user interface for taking notes may cause the system to present to the user a user interface to enable capturing of voice notes from the user by at least one microphone of the system.

The processor-executable instructions may further cause the at least one processor to, while the user is interacting with the other human: receive content of at least two notifications to be presented to the user; generate a list of notifications for the user based on the at least two notifications, the list of notifications to be presented to the user after the user is no longer interacting with the other human.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIGS. 3A, 3B, 3C, and 3D are top plan views that respectively show several examples where at least one processor can analyze captured audio data from a microphone to determine whether a user is interacting with another human, according to at least four respective illustrated implementations.

FIGS. 3E, 3F, 3G, and 3H are top plan views that respectively show several examples where at least one processor can analyze captured visual data from a camera to determine whether a user is interacting with another human, according to at least four respective illustrated implementations.

FIG. 3AA is a front elevational view that shows an example where at least one processor can analyze captured data from a plurality of user context sensors to determine whether a user is interacting with another human, according to at least one illustrated implementation.

FIG. 3AB is an isometric view that shows an example where user context data can be obtained by sources or user context sensors other than sensors on a WHUD, such as peripheral device, according to at least one illustrated implementation.

FIG. 3AC is a table that shows an example where user context data can be obtained from sources other than sensors on a WHUD, such as a calendar, according to at least one illustrated implementation.

FIGS. 6A, 6B, 6C, 6D, and 6E illustrate exemplary situations in which interaction assistance can be provided to a user based on an emotional state of the user and/or an emotional state of another human with whom the user is interacting, according to at least two illustrated implementations.

FIGS. 7A, 7B, and 7C illustrate exemplary situations in which interaction assistance can be provided to a user when the user is dominating a conversation, according to at least two illustrated implementations.

FIG. 9A illustrates an exemplary implementation for obtaining consent to capture such recordings.

FIGS. 10A, 10B, and 10C illustrate exemplary user interfaces in which interaction assistance can be provided to a user by generating, summarizing, or gathering information about the interaction, according to at least three illustrated implementations.

DETAILED DESCRIPTION

In the following description, certain specific details are set forth in order to provide a thorough understanding of various disclosed implementations and embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Figure 1:
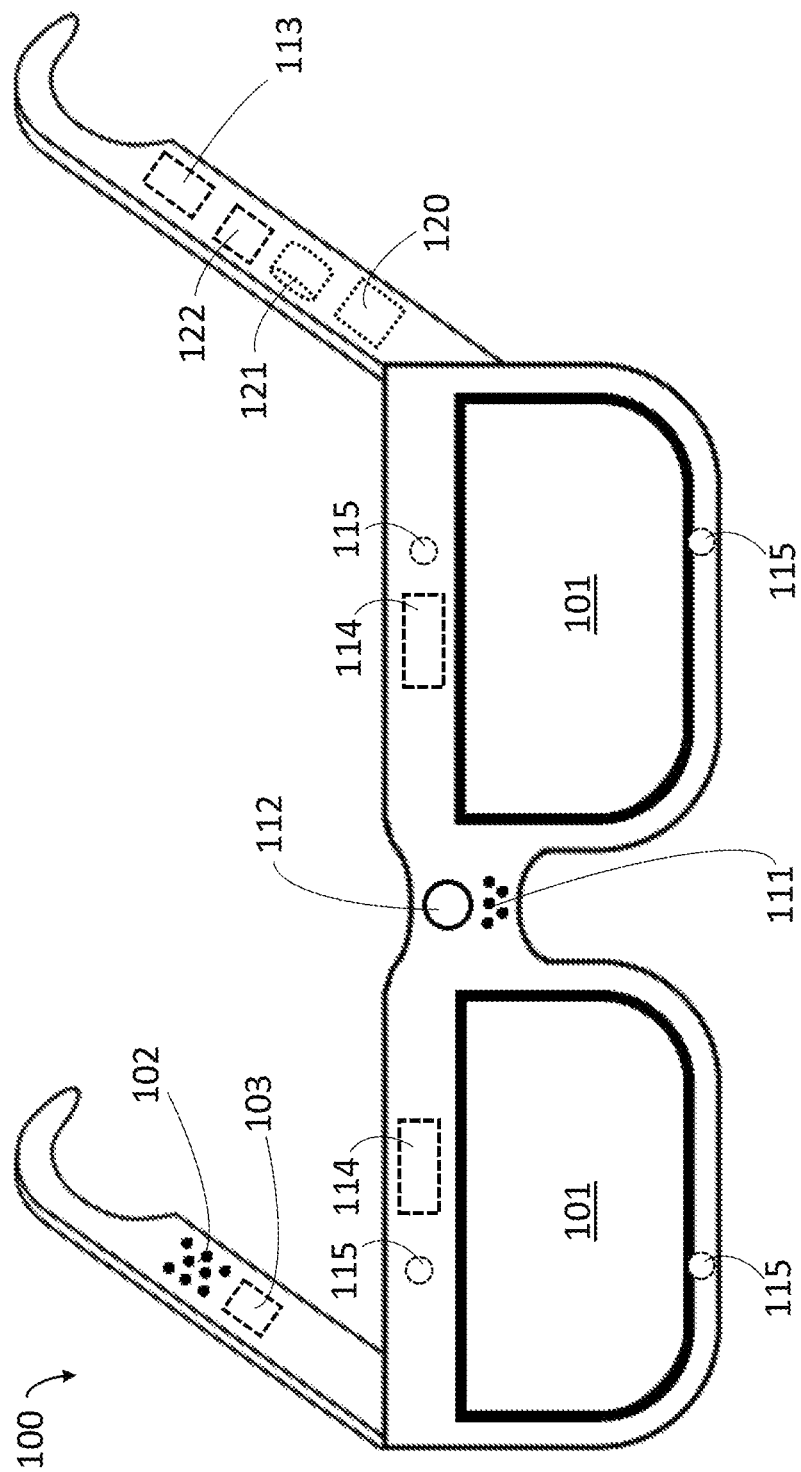
FIG. 1 is an isometric view of an exemplary wearable heads-up display ("WHUD") which can be used to determine whether a user is interacting with another human and control presentation of notifications according to the present systems, devices, and methods.

FIG. 1 illustrates an exemplary wearable heads-up display ("WHUD") 100 which can be used in the present systems, devices, and methods. FIG. 1 includes many structures which can be included on a WHUD as used in the present systems, devices, and methods, but one skilled in the art will appreciate that each of the illustrated structures in FIG. 1 is not required to achieve the present systems, devices, and methods, as will be discussed in more detail below. WHUDs as employed in the present systems, devices and method can be based on, for example, the WHUDs disclosed in U.S. Non-Provisional patent application Ser. No. 15/145,576, U.S. Non-Provisional patent application Ser. No. 15/167,458, or U.S. Non-Provisional patent application Ser. No. 15/046,254.

WHUD 100 as shown in FIG. 1 includes multiple output devices which can be used to present information and/or user interfaces to a user. These output devices can include, for example, display 101, speaker 102, haptic output interface 103, and any other output device as appropriate for a particular application. A WHUD in accordance with the present systems, devices, and methods can optionally include a plurality, all, or a combination of these output devices as shown in FIG. 1, but only requires only a single output device, such as a single display 101, a single speaker 102, or a single haptic output interface 103. Further, a WHUD in accordance with the present systems, devices, and methods can also include a plurality of any or all of the described output devices, such as a plurality of displays 101, a plurality of speakers 102, and/or a plurality of haptic output interfaces 103.

WHUD 100 as shown in FIG. 1 includes multiple sensors, which can be used to capture input which can indicate a context of the user, and which can be used to capture input from the user which provides instructions to the WHUD 100. These sensors can include microphone 111, camera 112, inertial measurement unit ("IMU") 113, eye-tracking system 114, proximity sensors 115 and any other sensor as appropriate for a particular application. A WHUD in accordance with the present systems, devices, and methods can optionally include a plurality, all, or a combination of these sensors as shown in FIG. 1, but only requires a single sensor, such as a single microphone 111, a single camera 112, a single inertial measurement unit 113, a single eye-tracking system 114, or a single proximity sensor 115. Further, a WHUD in accordance with the present systems, devices, and methods can also include a plurality of any or all of the described sensors, such as a plurality of microphones 111, a plurality of cameras 112, a plurality of inertial measurement units 113, a plurality of eye-tracking systems 114, and/or a plurality of proximity sensors 115. Since the above described sensors can be used to capture and measure information indicating context of a user of the system, throughout this specification the term "user context sensor" can refer to any of the above described sensors, or any other sensors which can be carried by a WHUD in accordance with the present invention, as appropriate for a given application. However, one skilled in the art will appreciate that the above described sensors can be more than just "user context sensors", in that the above described sensors can perform functions beyond just capturing user context, such as capturing user instructions, for example.

WHUD 100 as shown in FIG. 1 also includes at least one processor 120 and a non-transitory processor-readable medium 121 communicatively coupled to the at least one processor 120. The at least one processor 120 can be any suitable component which can execute instructions or logic, including but not limited to a micro-controller, microprocessor, multi-core processor, integrated-circuit, ASIC, FGPA, programmable logic device, or any appropriate combination of these components. The non-transitory processor-readable medium 121 can be any suitable component which can store instructions, logic, or programs, including but not limited to non-volatile or volatile memory, read only memory (ROM), random access memory (RAM), FLASH memory, registers, magnetic hard disk, optical disk, or any combination of these components. The non-transitory processor-readable medium 121 can store processor executable instructions which, when executed by the at least one processor 120, cause the WHUD 100 to implement the present systems, devices, and methods. Further, each of the output devices and sensors can be communicatively coupled to the at least one processor 120. That is, the at least one processor 120 is communicatively coupled to at least display 101, speaker 102, haptic output interface 103, microphone 111, camera 112, inertial measurement unit 113, eye tracking system 114, and proximity sensors 115.

Optionally, WHUD 100 can include wireless communication hardware, such as a wireless receiver, a wireless transmitter, and/or a wireless transceiver, for communicating with peripheral devices and/or external servers and content providers. FIG. 1 illustrates an exemplary wireless transceiver 122.

Certain elements of FIG. 1 are drawn in dashed lines, to indicate that these devices or structures are not normally visible at the current perspective of WHUD 100 as shown in FIG. 1, because the dashed elements are enclosed within a housing of the WHUD 100, or are occluded by other features such as the support structure or housing of WHUD 100. However, one skilled in the art will appreciate that these devices or structures do not necessarily have to be enclosed in the housing or behind other features of WHUD 100, but can be carried external to the housing or partially external as appropriate for a given application. Further, one skilled in the art will appreciate that although the output devices and sensors are shown at certain locations of the support structure of WHUD 100, one skilled in the art will appreciate that any of the output devices and sensors can be relocated to any location on the support structure as appropriate for a particular application.

Figure 2:
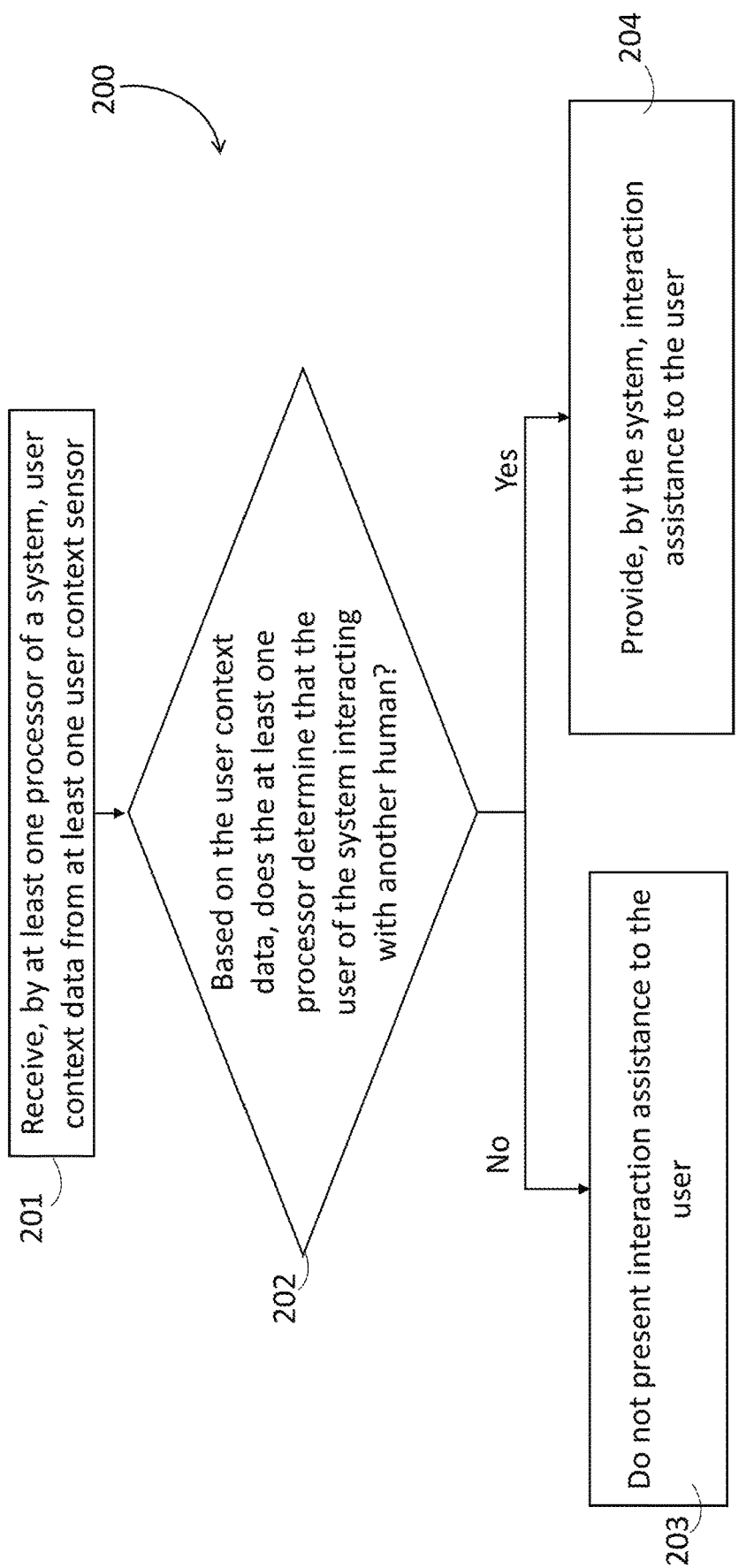
FIG. 2 is a flow diagram showing an exemplary method of determining whether a user is interacting with another human and presenting interaction assistance, according to at least one illustrated implementation.

FIG. 2 is a flow diagram showing a method 200 of providing interaction assistance to a user in accordance with the present systems, devices, and methods. Method 200 may be implemented using WHUD 100 as illustrated in FIG. 1, and reference numerals below refer to hardware components of WHUD 100 for ease of discussion, but one skilled in the art will appreciate that method 200 may also be implemented on any hardware as appropriate for a given application. Method 200 includes acts 201, 202, 203, and 204, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

At 201, the at least one processor receives user context data from at least one user context sensor, such as microphone 111, camera 112, IMU 113, eye tracking system 114, and/or proximity sensors 115. At 202, the at least one processor 120 determines whether the user of WHUD 100 is interacting with another human based on the user context data. "User context data" in the present systems, devices, and method refers to data which indicates a context of a user or can be analyze to determine a context of a user. Further, "data" can include many data points, i.e., a plurality of data, but can also encompass a single point of data, i.e., datum. Acts 201 and 202 are discussed in more detail below with reference to FIGS. 3A-3Y. In the context of the present systems, devices, and methods, "interacting with another human" generally refers to interacting or engaging with another human in the real world. Alternative terminology which could be used to express this concept could include interacting or engaging face-to-face with another human, interacting or engaging with another human in person, interacting or engaging physically with another human, interacting or engaging directly with another human, and engaging in human-to-human interaction, However, the present systems, devices, and methods could also be implemented in situations where the user is interacting with another human virtually, such as over a telephone, over the Internet, over a direct communication line, or over some other kind of communications network as appropriate for a given application. Such virtual interaction could include a voice call or a video call, as non-limiting examples.

Based on the outcome of act 202, the method proceeds to either act 203 or 204. If the at least one processor 120 determines that that the user is not interacting with another human, act 203 is performed, in which WHUD 100 does not present interaction assistance to the user. If the at least one processor 120 determines that the user is interacting with another human, act 204 is performed, in which WHUD 100 provides interaction assistance to the user. In summary, method 200 essentially involves at least one processor 120 of WHUD 100 determining whether a user is interacting with another human based on user context data, and presenting interaction assistance to the user if the user is interacting with another human. This interaction assistance can involve at least one or a combination of presenting biographical information about the other human, providing assistance interpreting and responding to an emotional state of the other human, providing assistance to prevent the user from dominating the interaction, providing candidate conversation topics, changing a size and/or location of a user interface presented by display 101, recording the interaction, generating a summary and/or transcript of the interaction, enabling a note-taking user interface, and grouping notifications received during the interacting, as are discussed in more detail below with reference to FIGS. 5A-5C, 6A-6E, 7A-7C, 8A, 8B, 9A-9C, 10A-10C, 11A-11C, 12A, 12B, 13, and 14A-14D.

Detecting Human-to-Human Interaction

Figure 3B:
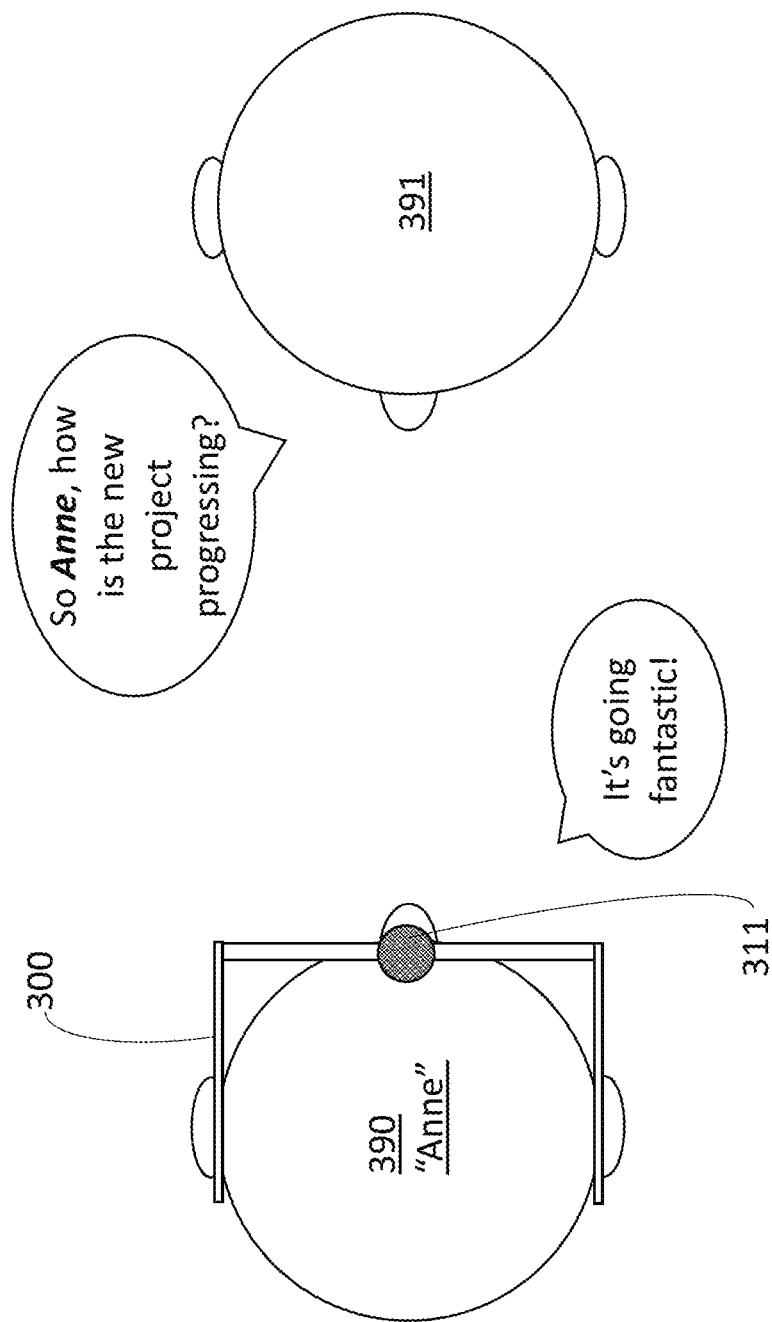
Figure 3C:
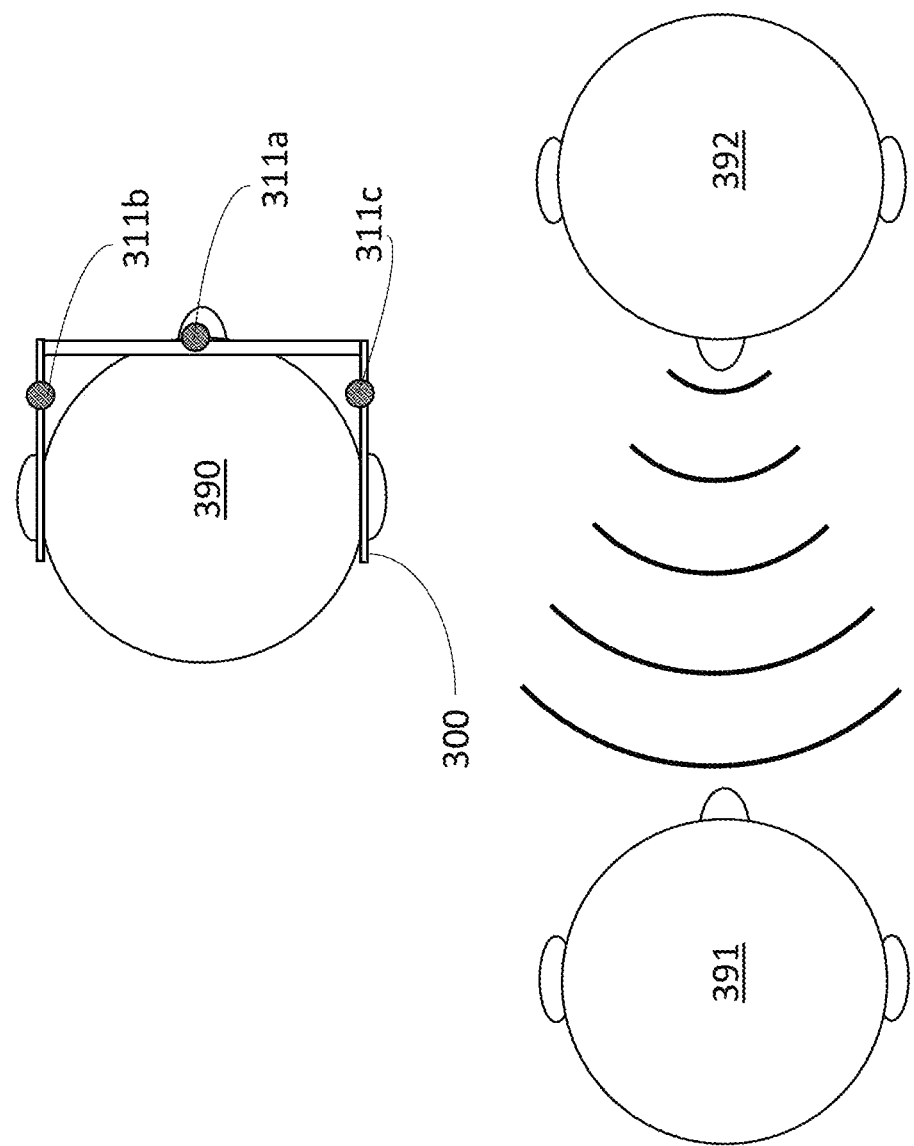
Figure 3E:
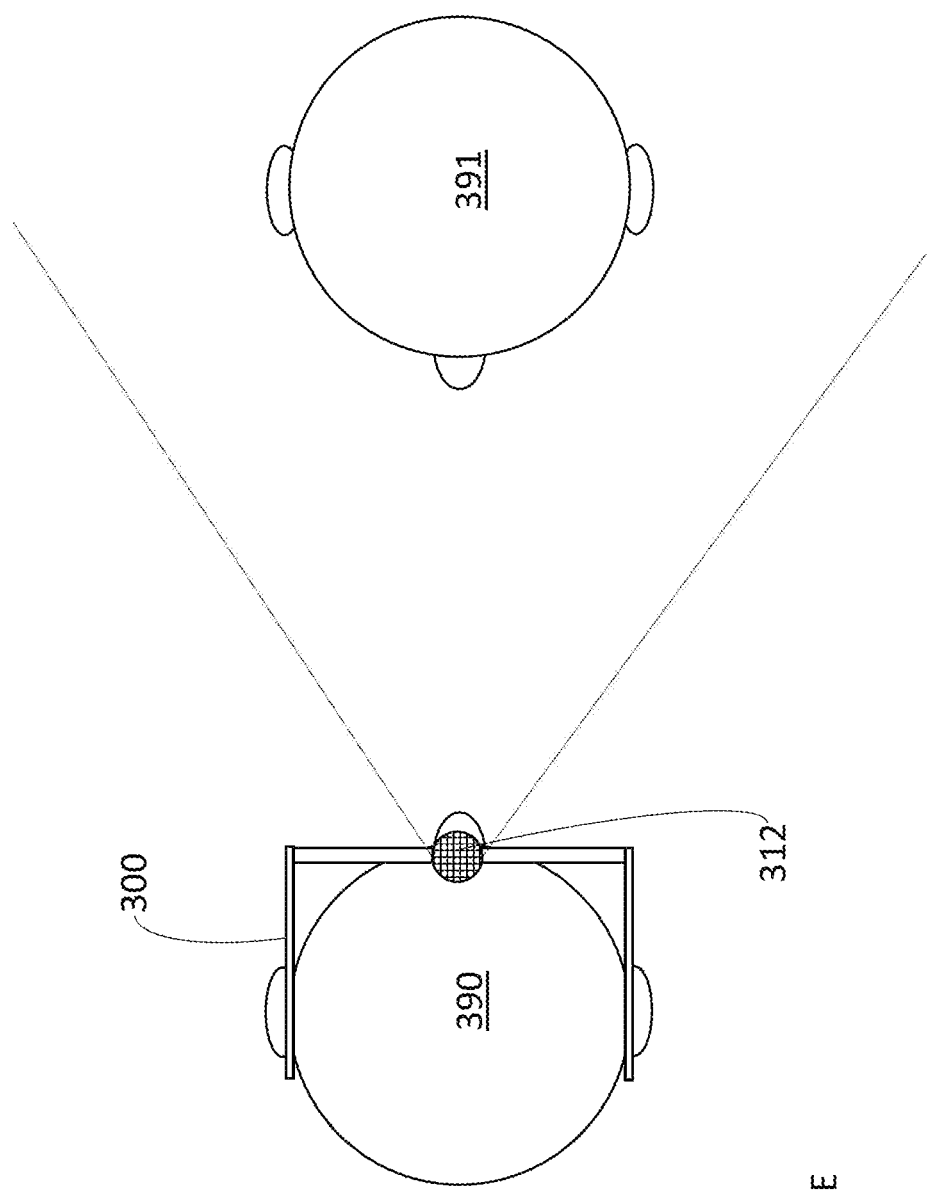
Figure 3G:
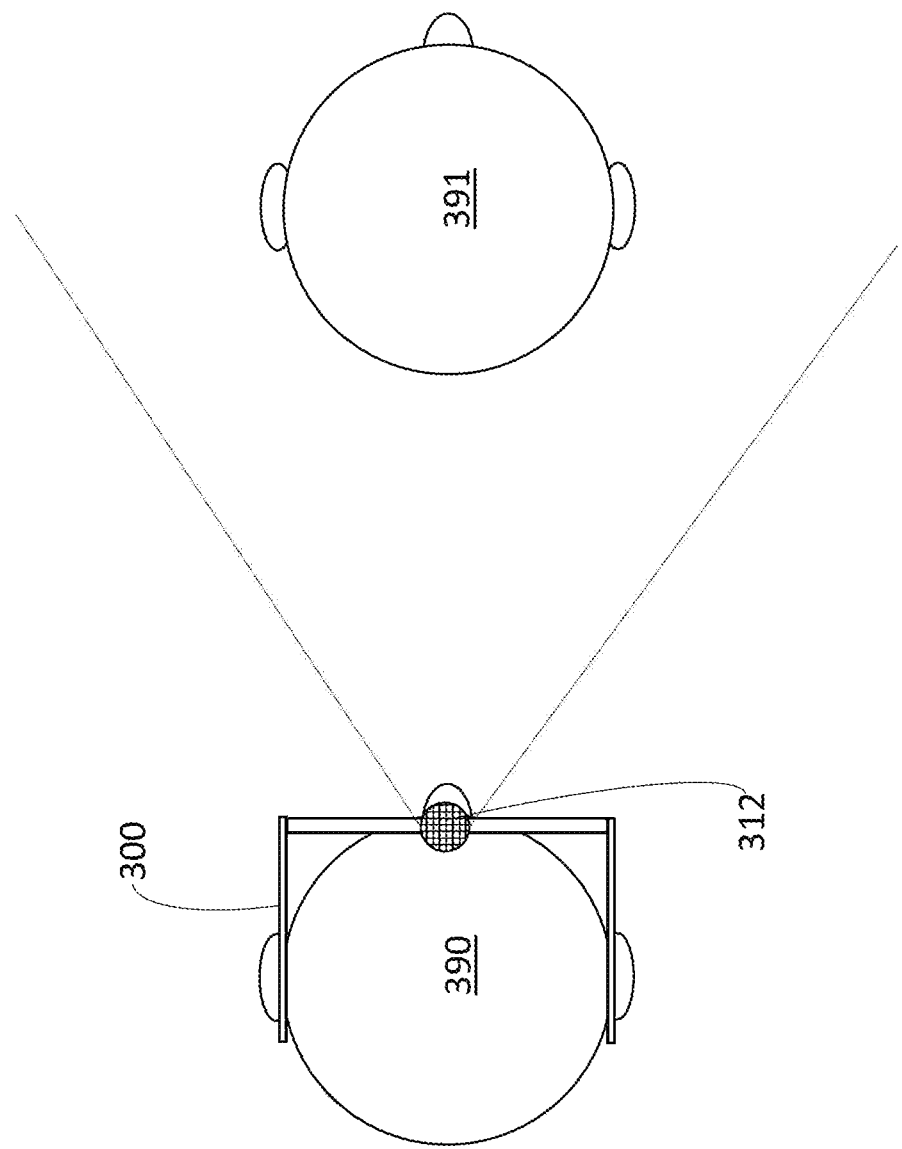
Figure 3H:
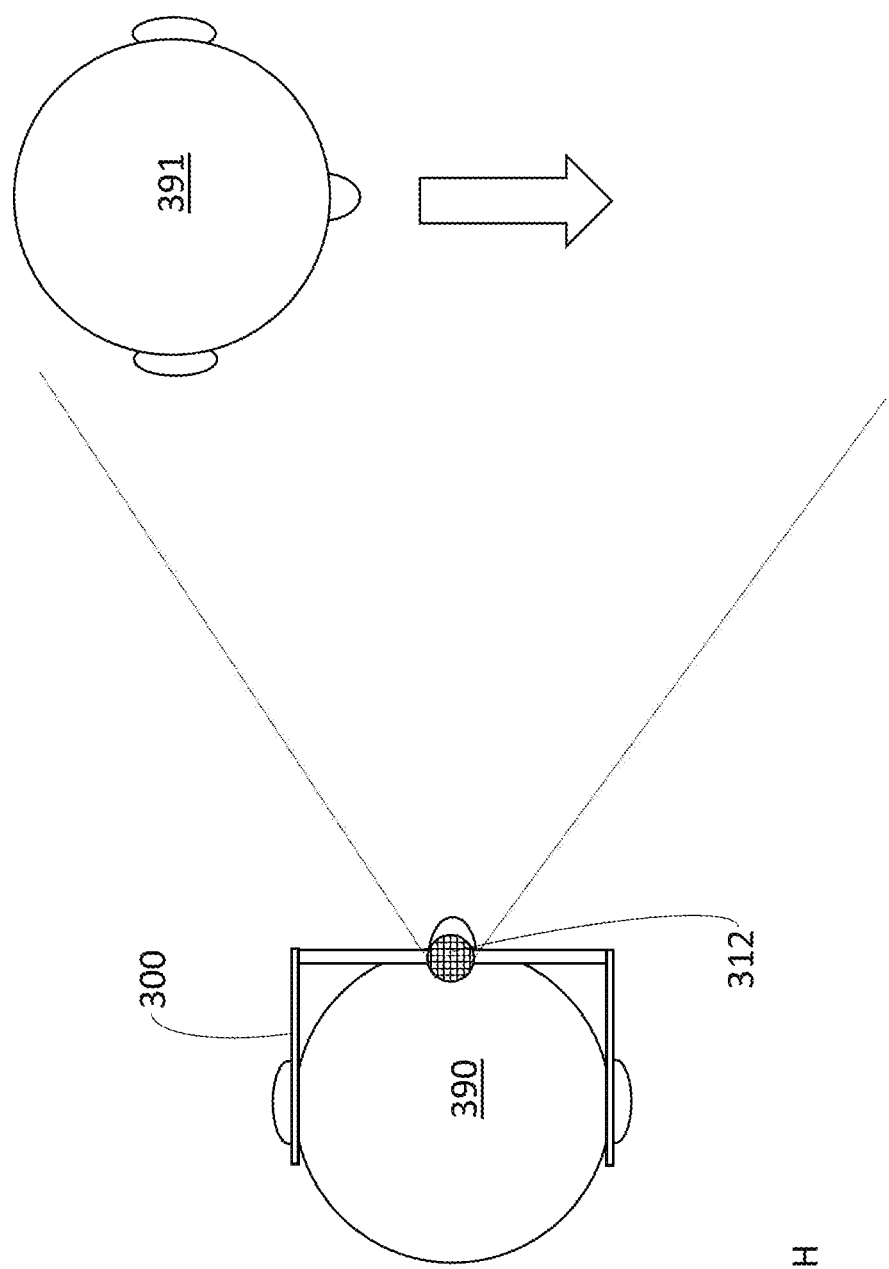
Figure 3J:
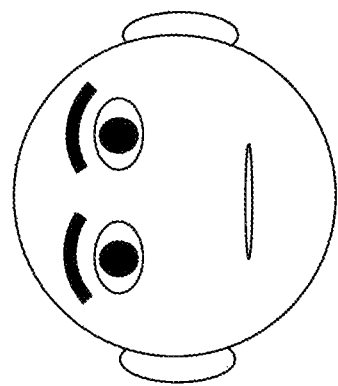
FIGS. 3I, 3J, 3K, 3L, 3M, and 3N are front elevational views that respectively show several examples where at least one processor can analyze captured visual data from a camera to determine whether a user is interacting with another human, according to at least five respective illustrated implementations.
Figure 3L:
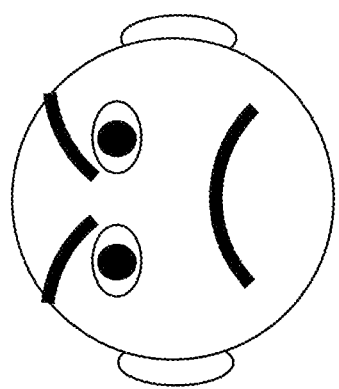
Figure 3I:
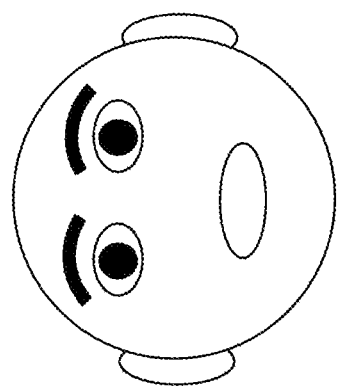
Figure 3K:
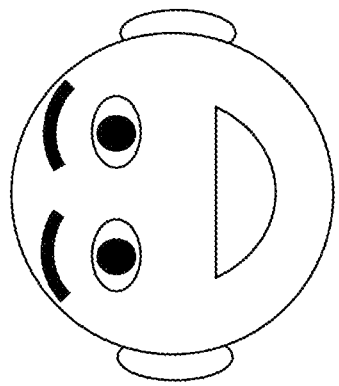
Figure 3N:
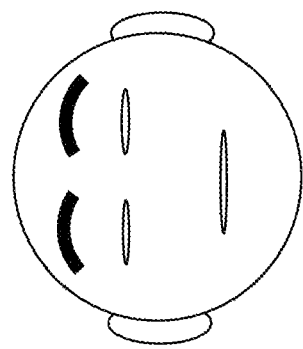
Figure 3P:
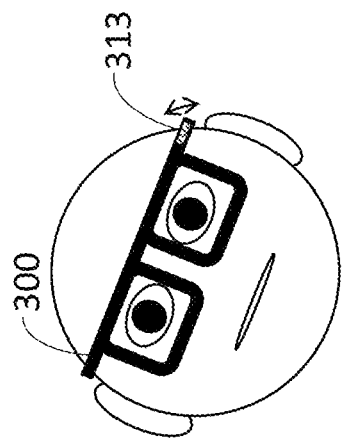
FIGS. 3O and 3P are front elevational views that respectively show examples where at least one processor can analyze captured user motion data from an inertial measurement unit to determine whether a user is interacting with another human, according to at least two respective illustrated implementations.
Figure 3M:
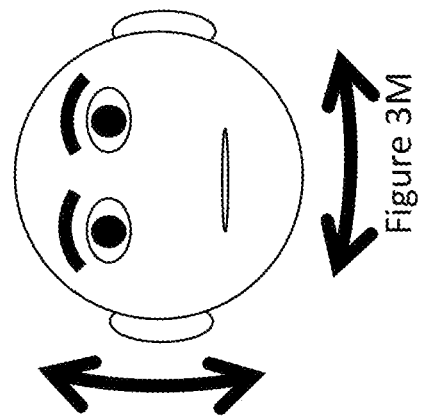
Figure 3O:
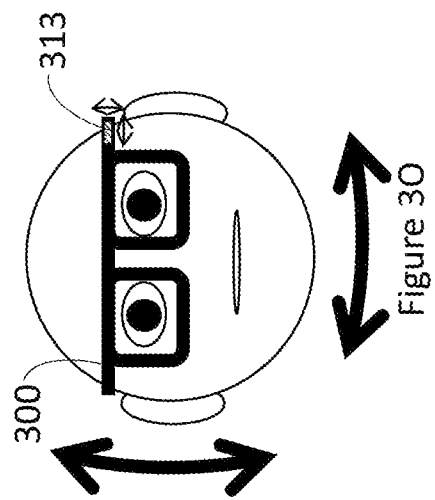
Figure 3R:
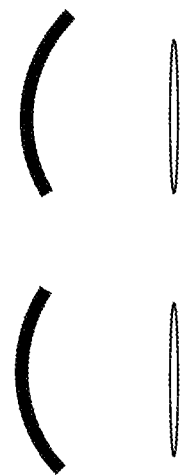
FIGS. 3Q, 3R, 3S, 3T, 3U, 3V, 3W, and 3X are front elevational views that respectively show several examples where at least one processor can analyze captured user eye data from an eye tracking system to determine whether a user is interacting with another human, according to at least eight respective illustrated implementations.
Figure 3T:
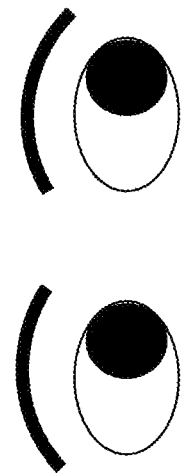
Figure 3Q:
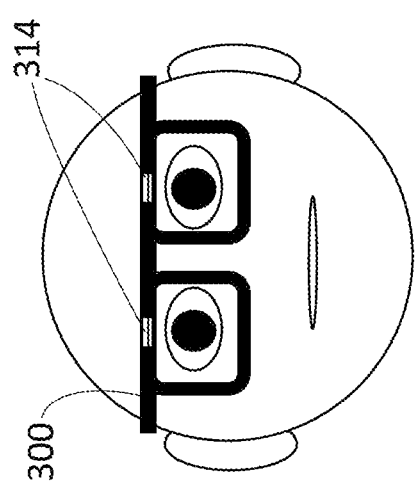
Figure 3S:
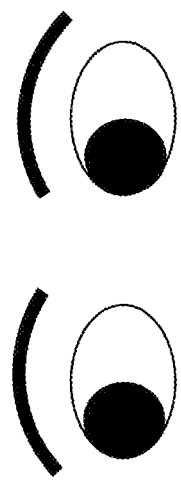
Figure 3V:
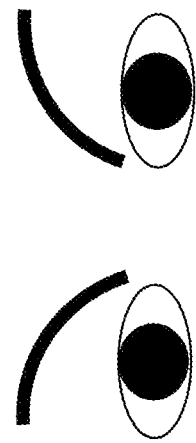
Figure 3X:
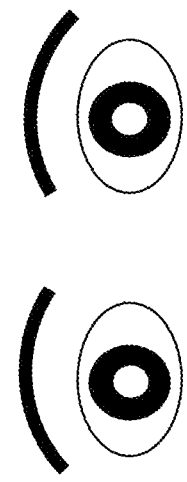
Figure 3U:
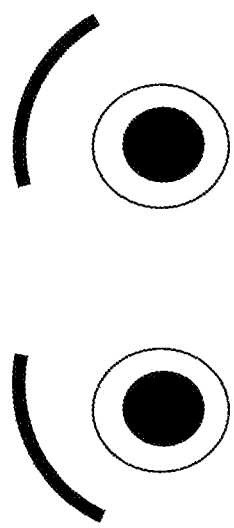
Figure 3W:
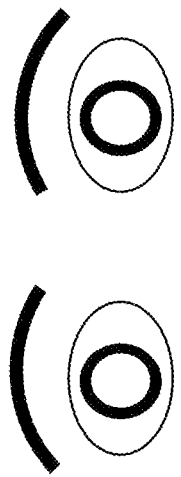
Figure 3Z:
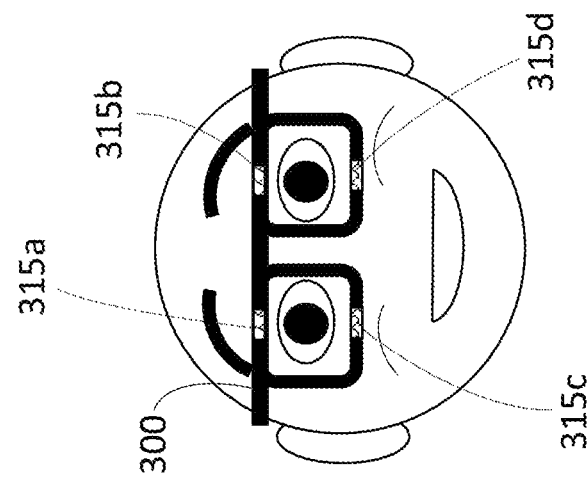
FIGS. 3Y and 3Z are front elevational views that respectively show examples where at least one processor can analyze captured user facial proximity data from proximity sensors to determine whether a user is interacting with another human, according to at least two respective illustrated implementations.
Figure 3Y:
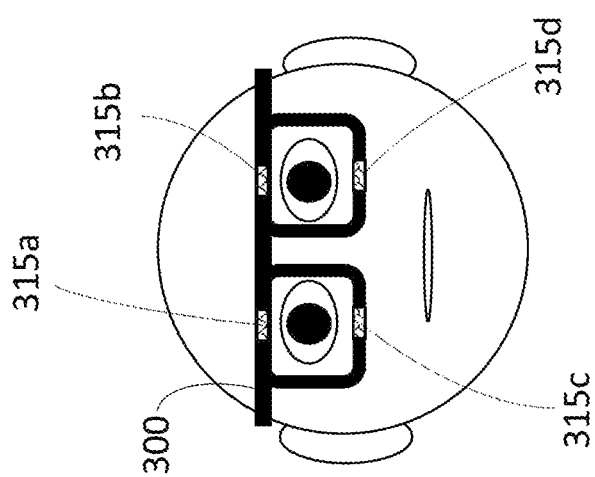
Figure 3A:
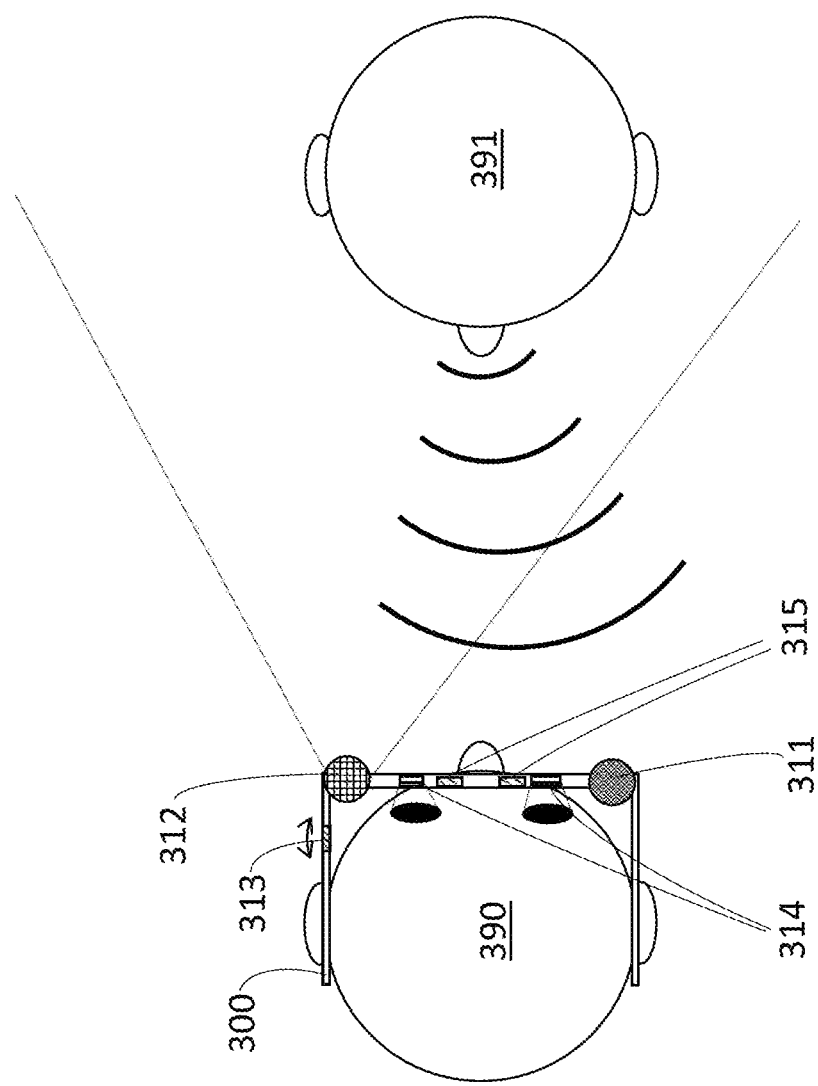
Figure 3A:
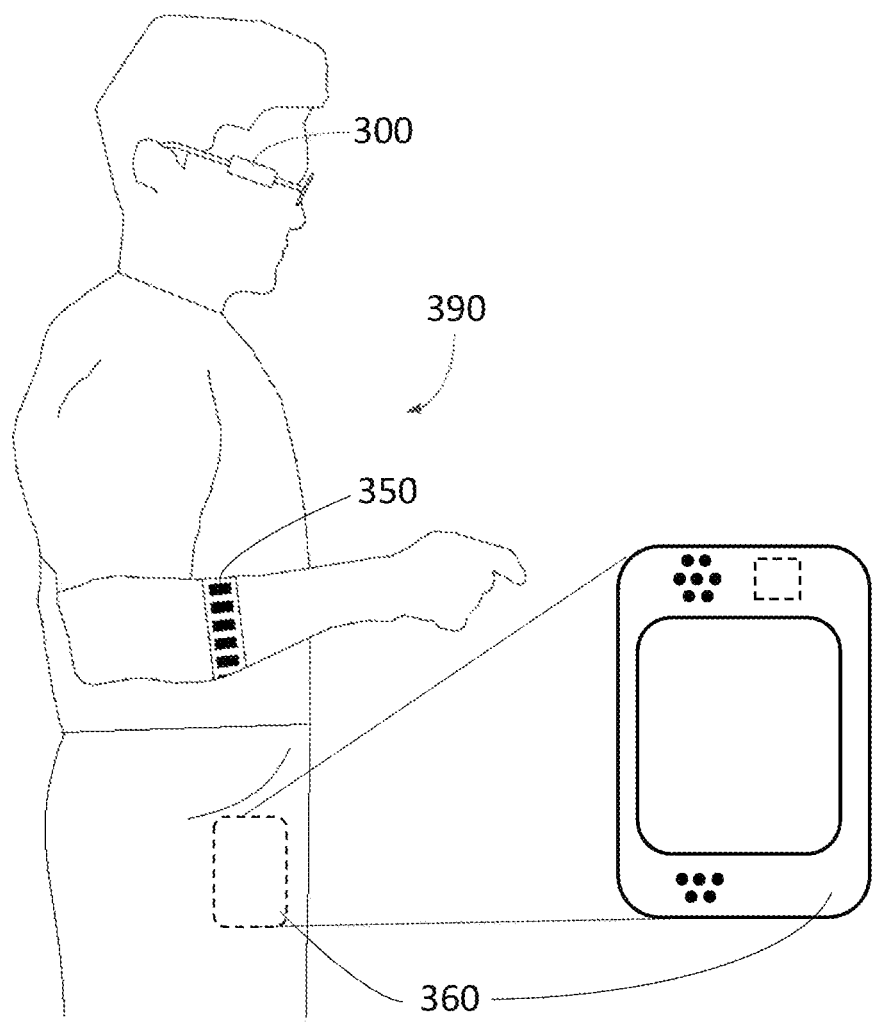

FIGS. 3A-3AC show many exemplary techniques for determining whether a user is interacting with another human. FIGS. 3A-3AC make reference to a WHUD 300, which can be substantially the same as WHUD 100 illustrated in FIG. 1 and described above. Similar to WHUD 100, one skilled in the art will appreciate that WHUD 300 need not include each of the output devices or sensors shown in FIG. 1, but can include only a single output device, a plurality of output devices, a single sensor, a plurality of sensors, or any combination thereof as appropriate for a given application. Further, although not specifically shown in FIGS. 3A-3AC to reduce clutter, WHUD 300 can also include at least one processor communicatively coupled to each of the user context sensors shown in FIGS. 3A-3AC. Optionally, WHUD 300 can also include wireless communication hardware, such as a wireless receiver, a wireless transmitter, and/or a wireless transceiver, for communicating with peripheral devices and/or external servers and content providers. One skilled in the art will appreciate that even though FIGS. 3A-3AC generally discuss determining whether a user is interacting with a single other human, each of these implementations is also fully applicable to situations in which there are multiple other humans around the user, such that determination of whether the user is interacting with another human can be performed for each other human around the user.

FIG. 3A shows a user 390 interacting with another human 391. User 390 is using WHUD 300 which includes microphone 311. In this case, microphone 311 captures user context data in the form of captured audio data, which can be analyzed by the at least one processor to determine whether the user is interacting with another human. FIGS. 3B-3D illustrate example techniques that can be used to analyze the captured audio data.

When analyzing captured audio data, the at least one processor can optionally first determine whether content of the captured audio data exceeds a volume threshold. As one example, such a threshold could be a minimum volume at which meaningful analysis could be performed on the captured audio data. As another example, such a threshold could be a minimum volume at which human-to-human interactions are likely to be conducted. That is, if the captured audio data is too quiet for a typical interaction, the at least one processor can pre-emptively determine that the user is not interacting with another human, and thus avoid expending power performing further analysis. Further, such a determination can be made based on a small amount of captured audio data. In this way, a small amount of audio data can be captured, and the at least one processor can determine whether the captured audio data exceeds a volume threshold. If the volume threshold is exceeded, the system can capture additional audio data, and further processing can be performed on the additional captured audio data. This further processing can determine with greater confidence whether the user is interacting with another human. On the other hand, if the at least one processor determines that the initially captured audio data does not exceed the volume threshold, the at least one processor can pre-emptively determine that the user is not interacting with another human, and no additional audio data needs to be captured or processed. Thus, power can be saved. Such an arrangement could allow for a cursory determination as to when the user might be interaction with another human, followed by additional capturing of data as needed to confidently determine when the use is interacting with another human.

The techniques discussed below can be performed after comparing volume of the captured audio data to a volume threshold, or can be performed without such a comparison, as appropriate for a given application.

FIG. 3B illustrates an example wherein the at least one processor can analyze the captured audio data to determine whether human speech is represented in the captured audio data. This can be accomplished by the at least one processor analyzing a frequency spectrum of the captured audio data, to determine whether the captured audio data includes frequencies of sound typically generated by humans when speaking. If the captured audio data includes frequencies typically generated by humans when speaking, the at least one processor could determine that the user is interacting with another human. Further, the at least one processor can analyze the captured audio data to detect a particular frequency range and/or frequency pattern corresponding to the voice of the user, thus improving accuracy of the determination of whether the user is interacting with another human, since the user will typically be speaking at least some of the time when interacting with another human. Additionally, the at least one processor could detect presence of a frequency spectrum or frequency patterns representing the user's voice, and a frequency spectrum or frequency patterns representing at least one other voice, to determine that the user is interacting with at least one other human. The system may utilize machine learning to learn a frequency range and/or particular frequency patterns of the user's speech over time. Additionally or alternatively, the system may learn temporal patterns of the user's speech, such as speaking speeds and pause patterns. These learned temporal patterns can then be used to identify when the user is speaking.

Further still, the at least one processor may analyze a pattern of the captured audio data to detect "turn-taking", which can be indicative of the user interacting with another human. "Turn-taking" refers to one human speaking, then another human speaking. There may be some overlap when multiple humans are speaking at the same time, but generally humans will take turns when interacting with each other. The at least one processor could detect turn-taking by detecting at least two different frequency spectrums or patterns representing at least two different voices, which tend to alternate. One of said frequency patterns could be detected as representing the user's voice. The at least one processor could also detect temporal patterns, like pauses between speech, in order to detect turn-taking.

Further still, the at least one processor may analyze the frequency spectrum of the captured audio data to determine whether the captured audio data includes frequencies which typically correspond to emotions expressed by humans. Since humans typically express emotion to other humans when interacting with them, the presence of emotional frequencies in the captured audio data can indicate that the user may be interacting with another human. In the example of FIG. 3B, user 390 says "It's going fantastic!", with heartfelt enthusiasm and excitement, which will result in certain frequencies being represented in the captured audio data. The at least one processor can identify these frequencies to determine that the user 390 is expressing emotion, and thus is likely interacting with another human.

Additionally, the at least one processor can also analyze content of the captured audio data to determine whether user 390 is interacting with another human. In the example of FIG. 3B, user 390, named "Anne", is interacting with another human 391 who says "So Anne, how is the new project going". The microphone 311 captures audio data of the other human 391 speaking and the at least one processor analyzes the content of the captured audio data. The at least one processor can determine that the other human 391 spoke user 390's name and can thus determine that user 390 is interacting with the other human 391. One skilled in the art will appreciate that analyzing content of the captured audio data is not limited to just listening for the user's name, but can include any content analysis as is appropriate for a given application. For example, the at least one processor could analyze the captured audio data for names and keywords related to a project the user is working on, events the user is scheduled to attend, names of family members and friends of the user, or any other suitable content related to the user.

FIG. 3C illustrates another example wherein the at least one processor can analyze source direction and/or source proximity of the captured audio data to determine whether user 390 is interacting with another human. In this example, a user 390 is wearing WHUD 300 which comprises a plurality of microphones 311a, 311b, and 311c, which can function as a microphone array. Microphones 311a, 311b, and 311c are capable of capturing audio data which indicates direction and position of a sound source, such that the at least one processor can determine whether user 391 is interacting with another human based on the direction, position, and proximity of a sound source. For example, as shown in FIG. 3C, two other humans 391 and 392 are interacting with each other, but are not interacting with user 390 who is nearby. The microphones 311a, 311b, and 311c capture audio data, and the at least one processor can determine the direction and position of the talking human 392 based on the captured audio data. The at least one processor can then determine that since the talking human 392 is not in front of or facing user 390, the user 390 is not interacting with talking human 392, and thus the user 390 is not interacting with another human. As an alternative example, if the at least one processor were to determine that a human is making sound directly in front of the user, the at least one processor may determine that the user is interacting with the other human. Additionally, one skilled in the art will appreciate that microphone 311 does not necessarily need to include a microphone array, but can instead include any other hardware capable of capturing audio data which indicates direction and position of a sound source.

Additionally, microphones 311a, 311b, and 311c may be a front-facing microphone 311a, a user-facing microphone 311b, and an ambient noise microphone 311c. The front-facing microphone 311a can be a microphone which captures audio data representing sound in front of the user, and can capture audio data from another human or other humans in front of the user. Further, although front-facing microphone 311a can be a narrow angle microphone which captures audio data representing sound originating in front of the user, front-facing microphone 311a can also be a wide-angle microphone which captures audio data representing sound originating in front of the user as well as at the user's periphery. Front facing microphone 311a can be used to capture sound originating from another human in front of or at the periphery of user 390, such as in each of the examples shown in FIG. 3A-3D, among any other suitable scenario. The user-facing microphone 311b can capture audio data representing sound originating from the user, such as the user's speech or voice commands. User-facing microphone 311b is particularly useful for the example shown in FIG. 3B, in which the user's speech represented in the captured audio data can be analyzed. Ambient noise microphone 311c can be a wide-angle or omnidirectional microphone which captures audio data representing the ambient environment of the user. This captured ambient audio data can be useful for determining the likelihood that the user is interacting with another user. For example, if the captured ambient audio data has a high volume, indicating that the ambient environment is quite loud, then the audio data captured by the other microphones 311a and 311b will be less indicative of whether the user is interacting with another human, since front-facing microphone 311a and user-facing microphone 311b will also capture the ambient noise. In such a case, WHUD 300 may choose to rely more on data from other user context sensors such as a camera, eye tracking system, IMU, or proximity sensors as discussed below.

One skilled in the art will appreciate that the positioning of front-facing microphone 311a, user-facing microphone 311b, and ambient noise microphone 311c is merely exemplary, and that each of these microphones could be repositioned to any suitable location on WHUD 300 as appropriate for a given application. For example, each of microphones 311a, 311b, and 311c could be positioned close together in a cluster, to form a tight microphone array. Additionally, each of microphones 311a, 311b, and 311c can include a plurality of microphones.

FIG. 3D illustrates another example wherein the at least one processor can analyze volume and/or source proximity of the captured audio data to determine whether user 390 is interacting with another human. In this example, user 390 is wearing WHUD 300 which includes microphone 311. Microphone 311 captures user context data in the form of captured audio data, and the at least one processor analyzes the volume of the captured audio data to determine whether user 390 is interacting with another human 391. If the volume of the captured audio data is too low, the at least one processor can determine that the user 390 is not interacting with another human 391, because the other human 391 is not speaking loud enough or is too far away to be interacting with user 390. This analysis could be reinforced if microphone 311 includes a microphone array or other hardware which can determine proximity of a sound source, and the at least one processor can analyze both the volume of the captured audio data and the proximity of the sound source to determine if user 390 is interacting with another human 391.

FIGS. 3E-3N illustrate cases where WHUD 300 includes camera 312. In these examples, camera 312 captures user context data in the form of captured visual data, which can be analyzed by the at least one processor to determine whether the user is interacting with another human.

FIG. 3E shows a user 390 interacting face-to-face with another human 391. Camera 312 captures visual data including a representation of the other human 391. The at least one processor then analyzes the captured visual data, determines whether there is another human represented in the visual data, and subsequently determines whether the user 390 is interacting with the other human. The at least one processor could determine that the user 390 is interacting with the other human 391 simply because the other human 391 is represented in the captured visual data. Alternatively, the at least one processor could take a more refined approach, such as determining based on the captured visual data whether the other human 391 is in close proximity to the user 390 and whether the other human 391 is facing the user 390. This refined approach is discussed in more detail below with regards to FIGS. 3F-3M below.

FIG. 3F shows a case where although the captured visual data includes a representation of another human 391, the other human 391 is far away from user 390. The at least one processor may analyze the captured visual data from the camera 312, and determine that even though another human 391 is represented in the captured visual data, the other human 391 is not in close proximity to user 390, which implies that the user 390 is not interacting with the other human 391. The at least one processor may thus determine that the user 390 is not interacting with another human.

FIG. 3G shows a case where although the captured visual data includes a representation of another human 391, the other human 391 is facing away from user 390. The at least one processor may analyze the captured visual data from the camera 312, and determine that even though another human 391 is represented in the captured visual data, the other human 391 is gazing in a direction which implies that the user 390 is not interacting with the other human 391. The at least one processor may thus determine that the user 390 is not interacting with another human.

FIG. 3H shows a case where although the captured visual data includes a representation of another human 391, the other human 391 is facing away from user 390 and is moving across user 390's field of view. The at least one processor may analyze the captured visual data from the camera 312, and determine that even though another human 391 is represented in the captured visual data, the other human 391 has a movement pattern which implies that the user 390 is not interacting with the other human 391. The at least one processor may thus determine that the user 390 is not interacting with another human.

FIGS. 3I-3N show examples where captured visual data may also be analyzed to determine a facial expression, facial expressions, gaze direction, a gesture, or gestures made by another human in order to determine whether user 390 is interacting with another human. As an example scenario, a user 390 could be riding a train where another passenger is directly in front of and facing the user 390, but is not interacting with the user 390. In such a case, facial analysis can be helpful to determine whether the other human is actually interacting with the user 390. FIGS. 3I and 3J show a case where the at least one processor can determine whether the other human is speaking by analyzing the captured visual data to determine if the other human's mouth is opening and closing. By determining whether the other human is speaking, the at least one processor can determine whether the user 390 is interacting with the other human. FIGS. 3K and 3L show cases where the other human is displaying emotion through facial expression, which implies that the other human may be interacting with someone, since facial expressions are used to convey emotion between humans. The at least one processor can analyze the captured visual data to determine if the other human is displaying emotion through facial expression, or through multiple changing facial expressions, and can thus determine whether the user 390 is interacting with the other human. Analysis of whether the other human is making an emotional facial expression can be based on at least one of an eye shape of the other human, eyebrow shape and position of the other human, eyelid movement patterns of the other human, mouth shape and position of the other human, and any other suitable characteristic as appropriate for a given application. Further, in each of FIGS. 3I-3L, the other human is gazing straight ahead, making eye contact with the user 390. The at least one processor can analyze this gaze direction of the user to determine whether the user is interacting with the other human, based on whether the other human is making eye contact with the user. If the other human were to be gazing away from the user 390, the at least one processor could determine that the user 390 may not be interacting with the other human. Further, the at least one processor could analyze gaze direction patterns of the other human over time to improve accuracy. For example, if the other human keeps looking at the user's eyes, even if their gaze regularly strays elsewhere, the at least one processor may determine that the user is interacting with the other human because the other human keeps making brief eye contact with the user. FIG. 3M shows a case where the at least one processor can determine whether the other human is making gestures, such as nodding or shaking the head, which implies that the other human is interacting with someone, since it is typical to make gestures and use body language when in a conversation with someone. By determining whether the other human is making gestures, the at least one processor can determine whether the user 390 is interacting with the other human. FIG. 3N shows a case where the at least one processor can analyze the captured visual data to determine a blink frequency of the other human. Humans tend to blink less frequently when they are focused in conversation, and thus a low blink frequency implies that a human is interacting with someone. In this regard, if the at least one processor can determine that the other human has a relatively low blink frequency, the processor can determine that the user 390 is likely interacting with the other human.

FIGS. 3O and 3P show a case where WHUD 300 includes IMU 313. In this example, the IMU 313 captures user motion data relating to movements, positions, and angles of the user. The IMU 313 provides this captured motion data to at least one processor. In turn, the at least one processor analyzes the captured motion data to determine if the user 390 is making gestures. Since humans typically make gestures while interacting with another human, such as nodding, shaking the head, and leaning as shown in FIGS. 3O and 3P, among many other types of gestures, by determining that the user 390 is making gestures, the at least one processor can determine that the user 390 is likely interacting with another human.

FIG. 3Q illustrates a case where WHUD 300 includes an eye tracking system 314. The eye tracking system 314 captures user eye data and provides this user eye data to the at least one processor, which in turn analyzes the user eye data to determine whether the user is interacting with another human. Although FIG. 3Q shows eye tracking system 314 as including an eye tracking component for each eye, one skilled in the art will appreciate that only a single eye tracking component which tracks movement of a single eye is necessary. Exemplary configurations for eye tracking can be found in for example U.S. Non-Provisional patent application Ser. No. 15/167,458, U.S. Non-Provisional patent application Ser. No. 15/827,667, and U.S. Provisional Patent Application Ser. No. 62/658,436. FIGS. 3R-3X describe determining whether a user is interacting with another human based on captured user eye data in more detail.

FIG. 3R shows a user 390's eyes when in a blinked state. Based on the captured user eye data provided to the at least one processor by the eye tracking system 314, the at least one processor can determine a blink frequency of user 390. Generally, when humans interact with each other, the humans will be more focused and tend to blink less than when they are not interacting. Thus, by determining that user 390 has a relatively low blink frequency, the at least one processor can determine that the user 390 is likely interacting with another human.

FIGS. 3S and 3T show a user 390's eyes in different positions, as in the case when the user 390 is looking around, and not focusing on something. Typically, when a user is interacting with another human, their eyes will be focused on the other human. On the other hand, if the user is not interacting with another human, they will often be looking around, not focused on anything in particular. Thus, based on the captured user eye data provided by the eye tracking system, if the at least one processor determines that the user 390's eyes are directed towards the same direction for an extended period of time, the at least one processor can determine that the user 390 may be interacting with another human. Conversely, if the at least one processor determines that the user 390's eyes are not focused in one direction for an extended period of time, the at least one processor can determine that the user is not likely interacting with another human. Further, the at least one processor could analyze gaze direction patterns of the user over time to improve accuracy. For example, if the user keeps looking at another human's eyes, even if their gaze regularly strays elsewhere, the at least one processor may determine that the user is interacting with the other human because the user keeps making brief eye contact with the other human.

FIGS. 3U and 3V show cases where user 390 is displaying emotion through facial expressions. A user making emotional facial expressions often implies that the user is interacting with another human, since humans typically use facial expression to communicate their feelings and emotions to other humans. Thus, the at least one processor can analyze the captured user eye data provided by the eye tracking system 314 in order to determine whether the user 390 is making an emotional facial expression, based on at least one of eye shape of at least one of the user's eyes, eyebrow shape and position of at least one of the user's eyebrows, eyelid movement patterns of at least one of the user's eyelids, or any other suitable characteristic as appropriate for a given application. If the at least one processor determines that the user is making an emotional facial expression or changing between multiple emotional facial expressions, the at least one processor can determine that the user 390 is likely interacting with another human. Conversely, if the at least one processor determines that the user 390 is not making an emotional facial expression, the at least one processor can determine that the user 390 is likely not interacting with another human.

FIGS. 3W and 3X show cases where the irises of the user 390 are in different states of dilation. Generally, dilation of a human's irises will increase when the human is in a state of emotional arousal. This can include the human being excited, surprised, scared, thrilled, happy, among many other emotions. Thus, dilation of a human's irises can be an indicator that the user is experiencing emotional responses, which are often experienced in human-to-human interactions. Thus, the at least one processor can analyze the captured user eye data provided by the eye tracking system 314 to determine whether the user is experiencing emotion based on dilation patterns of the user.

FIGS. 3Y and 3Z show an implementation where WHUD 300 includes a plurality of proximity sensors 315a, 315b, 315c, and 315d which capture user facial proximity data and provide this captured user facial proximity data to the at least one processor, which in turn analyzes the captured user facial proximity data to determine whether the user is interacting with another human. Each proximity sensor can measure the distance between a portion of the user's face and the WHUD 300, in order to determine facial expressions made by the user. Specifically, when a user makes different facial expressions, the user's cheeks tend to raise, lower, or change shape depending on the facial expression, and the user's eyebrows tend to raise, lower, or change angle and shape depending on the facial expression. Each of the proximity sensors can measure a distance between the WHUD 300 and a feature on the user's face, in order to determine a facial expression made by the user. In the example of FIGS. 3Y and 3Z, proximity sensor 315a measures the distance between the top of WHUD 300 and the user's right eyebrow, proximity sensor 315b measures the distance between the top of WHUD 300 and the user's left eyebrow, proximity sensor 315c measures the distance between the bottom of WHUD 300 and the user's right cheek, and proximity sensor 315d measures the difference between the bottom of WHUD 300 and the user's left cheek. In the example shown in FIG. 3Z, the at least one processor can determine that the user is smiling if the proximity sensors 315a and 315b indicate that the user's eyebrows are raised away from the top of the WHUD and if the proximity sensors 315c and 315d indicate that the user's cheeks are raised towards WHUD 300. One skilled in the art will appreciate that the placement of the proximity sensors and the specific features which they measure as discussed above and as shown in FIGS. 3Y and 3Z are merely exemplary, and one skilled in the art could reposition the proximity sensors and measure different facial features as appropriate for a given application.

FIG. 3AA shows an implementation which combines the above described hardware and techniques shown in FIGS. 3A-3Z onto WHUD 300. In FIG. 3AA, WHUD 300 includes microphone 311, camera 312, IMU 313, eye tracking system 314, and proximity sensors 315, any or all of which can be used to capture user context data and provide the captured user context data to at least one processor carried by WHUD 300. Although FIG. 3AA shows WHUD 300 as carrying user context sensors including all of microphone 311, camera 312, IMU 313, eye tracking system 314, and proximity sensors 315, one skilled in the art will appreciate that this is merely to illustrate that each of these sensors can be implemented on a single WHUD in combination, but that not each of these sensors is necessary to achieve the present systems, devices, and methods. For example, WHUD 300 could carry the following sensors: only a microphone and a camera; only a microphone and an IMU; only a microphone and an eye tracking system; only a microphone and proximity sensors; only a camera and an IMU; only a camera and an eye tracking system; only a camera and proximity sensors; only an IMU and an eye tracking system; only an IMU and proximity sensors; only a microphone, a camera, and an IMU; only a microphone, a camera, and an eye tracking system; only a microphone, a camera, and proximity sensors; only a microphone, an IMU, and an eye tracking system; only a microphone, an IMU, and proximity sensors; only a microphone, an eye tracking system, and proximity sensors; only a camera, an IMU, and an eye tracking system; only a camera, an IMU, and proximity sensors; only a camera, an eye tracking system, and proximity sensors; only an IMU, an eye tracking system, and proximity sensors; only a microphone, a camera, an IMU, and an eye tracking system; only a microphone, a camera, an IMU, and proximity sensors; only a microphone, a camera, an eye tracking system, and proximity sensors; only a microphone, an IMU, an eye tracking system, and proximity sensors; only a camera, an IMU, an eye tracking system, and proximity sensors; and each of a microphone, a camera, an IMU, an eye tracking system, and proximity sensors.

FIG. 3AB illustrates an implementation in which user context data can be received from sources other than sensors on a WHUD, such as peripheral devices external to the WHUD. In the example of FIG. 3AB, a user 390 is wearing a WHUD 300 and a gesture recognition armband 350, and is carrying a portable electronic device 360 in his pocket. In addition to receiving user context data from these other sources, the present systems, devices, and methods also include implementations in which some or all of the processing is performed by processors on devices external to the WHUD. For example, some of the processing to determine whether user 390 is interacting with another human can be performed by at least one processor on WHUD 300, gesture recognition armband 350, and/or portable electronic device 360. Alternatively, it is possible to perform all of the processing on a peripheral device external to the WHUD 300, such that the WHUD 300 does not require a processor. Instead, processed display information can be sent to a wireless receiver on the WHUD, to be directly displayed by the WHUD. In the context of implementations which include a WHUD and at least one peripheral device, such as FIG. 3AB, reference to "at least one processor" can refer to any processor or processors on the WHUD alone, any processors on the at least one peripheral device, or a combination of processors on the WHUD and on the at least one peripheral device. In the example of FIG. 3AB, "at least one processor" can refer to at least one processor on the WHUD 300 alone, gesture recognition armband 350 alone, or portable electronic device 360 alone, and can also refer to any processors on a combination of two or more of WHUD 300, gesture recognition band 350, and portable electronic device 360.

In the implementation of FIG. 3AB, WHUD 300 can include any or all of the features of the WHUDs described above with regards to FIGS. 3A-3AA, and determination of whether a user is interacting with another human can be performed using any or all of the techniques discussed above with regards to FIGS. 3A-3AA. Gesture recognition armband 350 can include at least one or a plurality of electromyography sensors, mechanomyography sensors, IMUs, or any other suitable sensor which can be used to recognize gestures. Exemplary gesture recognition bands are described in at least U.S. Pat. Nos. 9,299,248, 9,299,248, 9,367,139, 9,389,694. Gesture recognition armband 350 is communicatively coupled with WHUD 300, preferably wirelessly, but a wired connection is also possible. Gesture recognition armband 350 can provide user context data which can be used to determine whether user 390 is interacting with another human, since humans typically use gestures to communicate with each other, and thus the use of gestures can indicate that a user is interacting with another human. More specifically, gesture recognition band 350 can provide user context data which indicates whether user 390 is making gestures, and can also indicate what gestures user 390 is making and how strongly and emphatically the gestures are being made. Each of these attributes can be used to determine whether user 390 is interacting with another human. For example, if gesture recognition armband 350 determines that user 390 is making strong, emotional pleading gestures, at least one processor can determine that the user 390 is likely interacting with another human, since a direct, communicative gesture is being made strongly. On the other hand, if gesture detection armband 350 determines that the user's arm is simply swinging back and forth, indicating that user 390 is walking, at least one processor can determine that the user 390 is likely not interacting with another human. Portable electronic device 360 can for example be a smartphone, PDA, tablet, cellular telephone, or any other suitable portable electronic device, such as device 1700 as discussed with regards to FIG. 17 below. Portable electronic device 360 is communicatively coupled with WHUD 300, preferably wirelessly, but a wired connection is also possible. Portable electronic device 360 can include at least one or a plurality of sensors, such as at least one microphone, IMU, GPS sensor, or any other suitable sensor. User context data from these sensors can be used to determine whether a user is interacting with another human. For example, a microphone of portable electronic device 360 could be used in a similar manner to the microphones discussed with regards to FIGS. 3A-3D above. As another example, either or both of the IMU and the GPS sensor could be used to determine whether user 390 is moving, which indicates that the user 390 is likely not interacting with another human. Additionally, the movement speed of the user 390 could be determined, in order to determine what means the user is moving by. For example, if the user is moving at less than 30 kilometers per hour, at least one processor could determine that the user is walking, running, or biking, and is thus not likely interacting with another human. On the hand, if the user 390 is moving above 30 kilometers per hour, at least one processor can determine that the user could be in a car, train, or other motorized transport, and thus may still be interacting with another human.

FIG. 3AC illustrates another example source of user context data, namely a user's calendar 370. A calendar can be stored on a processor-readable medium of WHUD 300; a processor-readable medium of a peripheral device such as gesture recognition band 350 or portable electronic device 360; a processor-readable medium on a remote server accessed through a communications network such as the Internet; or any other suitable storage medium and location as appropriate for a given application. By analyzing a user's calendar, at least one processor can determine whether the user is currently in a scheduled meeting or event, the nature of the event, how many people are attending the event, and who is attending the event. This information can be used to determine the likelihood that the user is interacting with another human. For example, in FIG. 3AC, the user has a picnic with family scheduled from 9:00 AM to 12:00 PM on Sunday. The at least one processor may determine that during this time period, the user is at an intimate social event with a small group of important people, and thus the at least one processor can determine that the user will likely be interacting with at least one other human a lot during this meeting. As another example, the user has a 1 on 1 meeting or call with their boss scheduled from 12:00 PM to 3:00 PM on Monday. The at least one processor may determine that since the user has an intimate meeting scheduled with a single important person, the user will almost certainly be interacting with another human for the entirety of this event. As another example, the user has relaxing time alone scheduled from 6:00 PM to 9:00 PM on Tuesday. The at least one processor may determine that since the user is scheduled to be alone, the user will most likely not be interacting with another human during this time period. As another example, the user has a potluck dinner scheduled from 6:00 PM to 9:00 PM on Thursday. The at least one processor may determine that since the user is scheduled to be at a casual event with a large amount of people, the user may not be interacting with other humans for the entirety of the event. As another example, the user has a company-wide meeting scheduled from 9:00 AM to 12:00 PM on Friday. The at least one processor may determine that since there are so many people attending the meeting, the user will probably not be interacting directly with another human during the meeting. One skilled in the art will appreciate that the calendar format and timeslots shown in FIG. 3AC are merely exemplary, and that a calendar could use any suitable format and timeslots as appropriate for a given application.

Determination of whether a user is interacting with another human is not limited to analyzing a single property of the user context data, nor limited to analyzing user context data from a single user context sensor. Rather, determining whether a user is interacting with another human can involve the at least one processor analyzing a combination of any or all of the properties of the user context data, as well as a combination of user context data from any or all of the user context sensors. Several exemplary combinations are discussed below, but one skilled in the art will appreciate that these combinations are only exemplary, and that the present systems, devices, and methods encompass any combined analysis of the above described properties of the user context data, as well as any combination of user context data provided from any of the different types of user context sensors, as appropriate for a given application.

In one exemplary combination, the at least one processor may analyze captured audio data provided by microphone 311 to determine whether another human 391 is positioned directly in front of and in close proximity to user 390, that the content spoken by the other human 391 is related to user 390, and that the volume of the captured audio data is above a threshold, in order to determine whether the user 390 is interacting with the other human 391.

In another exemplary combination, the at least one processor may analyze captured audio data provided by microphone 311 to determine whether another human 391 is in close proximity to user 390 and that the volume of the captured audio data is above a threshold, and the at least one processor may analyze captured user motion data provided by the IMU to determine whether the user 390 is making head motions, in order to determine whether the user 390 is interacting with the other human 391.

In another exemplary combination, the at least one processor may analyze captured audio data to determine whether another human 391 is positioned directly in front of and in close proximity to user 390, and the at least one processor may analyze captured visual data to determine whether the other human 391 is represented in the captured visual data, is facing the user, and is opening and closing their mouth to speak, in order to determine whether the user 390 is interacting with the other human 391.

In another exemplary combination, the at least one processor may analyze captured visual data to determine whether the other human 391 is making emotional facial expressions, and the at least one processor may analyze captured user eye data to determine whether the user is making emotional facial expressions, in order to determine whether the user 390 is interacting with the other human 391.

In another exemplary combination, the at least one processor may analyze the following to determine whether a user is interacting with another human: captured audio data from microphone 311 to determine whether the user is speaking and whether there are emotions expressed in the user's voice based on the frequency spectrum of the captured audio data; captured user motion data from IMU 313 on WHUD 300 to determine whether a head of the user is still or not; captured user motion data from an IMU of a peripheral device to determine whether a user is moving; and user schedule data from a calendar to determine whether a user is currently attending a scheduled meeting or event.

In another exemplary combination, the at least one processor may analyze the following to determine whether a user is interacting with another human: captured audio data from microphone 311 or a plurality of microphones 311*a*, 311*b*, and 311*c* to determine whether the user is speaking or another human is speaking and whether there are emotions expressed in the user and other human's voice based on the frequency spectra of the captured audio data, and to determine a level of ambient background noise present in the captured audio data; captured visual data from a camera 312 of WHUD 300 to determine whether another human is in front of the user, whether the other human is facing the user, whether the other human's mouth is moving, and a facial expression of the other human; captured user motion data from IMU 313 on WHUD 300 to determine whether a head of the user is making gestures such as nodding and shaking of the user's head; captured user motion data from an IMU of a peripheral device to determine whether a user is moving and at what speed; captured user eye data from an eye tracking system 314 to determine a blink frequency of a user, eye movement patterns of a user, and gaze direction of a user; and user schedule data from a calendar to determine whether a user is currently attending a scheduled meeting or event.

The present systems, devices, and methods can encompass a number of implementations for combining analysis of multiple properties of the user context data, and for combining analysis of user context data from multiple user context sensors. For convenience, the terminology "properties" of the user context data as discussed herein should be interpreted broadly, to include not only properties of user context data from a single sensor (such as volume of captured audio data or source direction of captured audio data, for example), but also to include user context data from different user context sensors (such as user blink frequency in the captured user eye data or facial expression of another human in the captured visual data). Several exemplary implementations of how to perform this combined analysis are discussed below, with reference to a combination wherein the at least one processor may analyze captured audio data provided by microphone 311 to determine that another human 391 is in close proximity to user 390 and that the volume of the captured audio data is above a threshold, and the at least one processor may analyze captured user motion data provided by the IMU to determine that the user 390 is making head motions. This combination is referred to for convenience, and one skilled in the art will appreciate that the below discussed implementations for combined analysis are fully applicable to any combination of analysis of properties of the user context data and analysis of user context data from multiple user context sensors.

In a first implementation, the combined analysis can be structured such that if any one individual property of the user context data provided by any one sensor indicates that the user may be interacting with another human, the at least one processor determines that the user 390 is interacting with another human. For example, in the combination mentioned above, if any one of: another human 391 is in close proximity to user 390; the volume of the captured audio data is above a threshold; or the user is making head motions, the at least one processor may determine that the user 390 is interacting with another human 391. This implementation is advantageously very efficient, in that the at least one processor needs to perform a minimal amount of work to determine whether a user is interacting with another human.

However, this implementation can be prone to false positives, in which the at least one processor determines that the user is interacting with another human even if they aren't, since the determination can be based on a single property of the user context data.

In a second implementation, the combined analysis can structured as a checklist, such that each property of a selected set of properties must indicate that a user is interacting with another human in order for the at least one processor to conclusively determine that the at least one user is interacting with another human. For example, in the combination mentioned above, if each of: another human 391 is in close proximity to user 390; the volume of the captured audio data is above a threshold; and the user is making head motions, the at least one processor may determine that the user 390 is interacting with another human 391. This implementation advantageously mitigates false positives, by requiring a number of criteria to be fulfilled before the at least one processor will conclusively determine that the user is interacting with another human. However, if too many properties are required to indicate that the user is interacting with another human, this implementation may fail to identify many cases where a user is interacting with another human.

In a third implementation, the combined analysis can structured such that a threshold number of properties of a selected set of properties must indicate that a user is interacting with another human in order for the at least one processor to conclusively determine that the at least one user is interacting with another human. For example, in the combination mentioned above, the threshold number of properties could be set as two, such that if any two of: another human 391 is in close proximity to user 390; the volume of the captured audio data is above a threshold; and the user is making head motions, the at least one processor may determine that the user 390 is interacting with another human 391. This implementation advantageously mitigates false positives, by requiring a number of criteria to be fulfilled before the at least one processor will conclusively determine that the user is interacting with another human, while also allowing some flexibility but not requiring that each and every property indicate that a user is interacting with another human. One skilled in the art will appreciate that the threshold number of properties could be set at any value, and the exemplary value of two is merely for illustrative purposes. For example, if ten different properties were being analyzed by the at least one processor, the threshold could be set at any number between 1 and 10.

In a fourth implementation, confidence scoring can be used to weight each property of a selected set of properties, to determine a level of confidence that the user 390 is interacting with another human 391. Specifically, the at least one processor may calculate a confidence score, which is increased for each analyzed property that indicates a user may be interacting with another human. The at least one processor may also lower the confidence score for each analyzed property which indicates that the user may not be interacting with another human. The at least one processor may not adjust the confidence score for each analyzed property which does not indicate either that the user is interacting with another human or is not interacting with another human. Further, increases and decreases to the confidence score do not need to be balanced between different properties. Instead, the at least one processor may weight certain properties higher than others, such that an adjustment to the confidence score based on a first property can be of greater magnitude than an adjustment to the confidence score based on a second property different from the first property. As an example, the at least one processor could assign a high weight to the properties which indicate that another human is directly in front of the user, and could assign a lower weight to the properties which indicate that the user is making an emotional facial expression, such that the magnitude of adjustment to the confidence score based on the properties which indicate that another human is directly in front of the user will be higher than the magnitude of adjustment to the confidence score based on the properties which indicate that the user is making an emotional facial expression. As a result, if the at least one processor were to determine that another human is directly in front of the user, but the user is not making an emotional facial expression, the at least one processor may still increase the confidence score that the user is interacting with the other human, since the properties indicating the other human is directly in front of the user are weighted higher than the properties which indicate that the user is making an emotional facial expression. Further still, adjustments to the confidence score can be roughly weighted, or can be weighted based on a gradient. In implementations where rough weighting is used, the at least one processor can make a simple determination for each property of whether the property indicates that the user is interacting with another human, indicates that the user is not interacting with another human, or indicates neither. Based on this determination, the at least one processor can either increase the confidence score by a set amount if the property indicates that the user is interacting with another human, decrease the confidence score by a set amount if the property indicates that the user is not interacting with another human, or leave the confidence score unchanged if the property indicates neither. Alternatively, in implementations where a gradient used, the at least one processor can make a determination of how strongly a given property implies that a user is interacting with another human. For example, if there is another human in front of the user, at least one processor could determine that the strongest possibility that the user is interacting with the other human, and thus the highest confidence score weight, occurs if the other human is directly in front of the user. The further away from directly in front of the user the other human is, the less strong the possibility that the user is interacting with the other human, and thus the less high the confidence score. Further, the at least one processor can also decrease the confidence score using a gradient, by determining how strongly a given property implies that a user is not interacting with another human. For example, the at least one processor could determine that the quieter the captured audio data, the less likely it is that the user is interacting with another human, and thus the at least one processor could decrease the confidence score based on how low the volume of the captured audio data is. By using rough weighting wherein a given property is determined as increasing the confidence score, decreasing the confidence score, or not changing the confidence score, and adjusting the confidence score by a set value accordingly, can be performed quickly and requires less processing power. On the other hand, weighting the confidence score using gradients is more processor intensive, but will also provide more accurate determinations.

Ideally, all of the user context sensors of WHUD 300 can capture user context data continuously and provide this continuous user context data to the at least one processor, such that the at least one processor can make the most informed determinations possible. However, on many devices, this will not be practical, because continuously capturing and analyzing the user context data will consume battery life very quickly, thus reducing operational time of the device as well as potentially causing the device to become hot and uncomfortable for the user. To address this issue, it would be helpful to have the user context sensors of WHUD 300 selectively active at appropriate times, to minimize operation time, thus reducing power consumption.

One implementation could be to have one, all, or a set of the user context sensors activate and capture data at periodic intervals as intermittent user context data samples. For example, every 1 minute, any one or a combination of a microphone 311, camera 312, IMU 313, eye-tracking system 314, and proximity sensors 315 included in a WHUD 300 can activate and capture 1 second of data. At least one processor of the WHUD 300 can analyze this 1 second of data from each user context sensor to determine whether a user is interacting with another human. Further, each sensor does not necessarily need to capture the same amount of data. For example, the microphone 311 could capture 2 seconds of audio data, the camera 312 could capture a single instant of visual data as a still image, the IMU 313 could capture 5 seconds of user motion data, the eye-tracking system 314 could capture 3 seconds of user eye data, and the proximity sensors 315 could capture 10 seconds of user location data. The above described periodic interval and amounts of captured data are merely exemplary, and any length of periodic interval or amount of data could be captured as is appropriate for a given application. In general, the exact periodic interval and amount of data to capture should strike a balance between optimizing accuracy of the at least one processor determining whether the at least one user is interacting with another human, and obtaining a desirable operational battery life of the WHUD 300.

Alternatively or additionally, one low power user context sensor could continuously capture user context data, and could activate at least one other user context sensor in response to capturing user context data which may indicate that a user is interacting with another human. For example, an IMU 313 of a WHUD 300 could continuously capture user motion data, and at least one processor of the WHUD 300 could determine based on the captured user motion data that if a user starts making head motions indicative of interaction with another human, at least one other user context sensor in the WHUD 300 should be activated to capture additional user context data similarly to as described above. The at least one processor can then analyze the additional user context data to increase accuracy of a determination of whether the user is operating a vehicle.

Figure 4B:
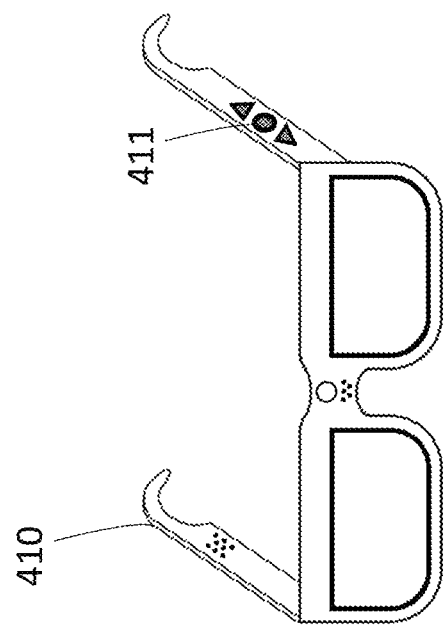
FIGS. 4A and 4B are isometric views that respectively show examples of WHUDs having user input mechanisms, according to at least two illustrated implementations.
Figure 4A:
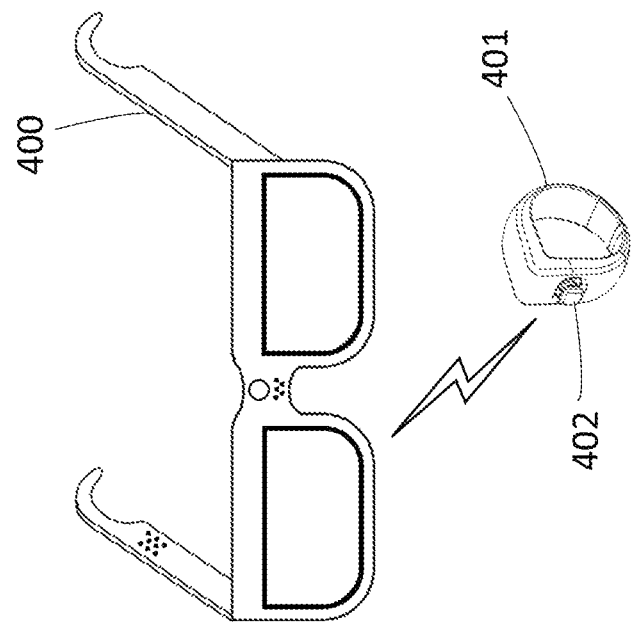

Alternatively or additionally, one, all, or a set of the user context sensors can activate and capture user context data in response to the at least one processor receiving user input. Activation of user context sensors and collection data could be similar as described above. In this regard, FIGS. 4A and 4B illustrate exemplary user input mechanisms that could be used in the present systems, devices, and methods. FIG. 4A shows a control ring 401 having a user input mechanism 402, which can include for example a joystick, a button, buttons, or a touch-sensitive area, among any other type of input mechanism as appropriate for a given application. Control ring 401 receives user input through user input mechanism 402, and transmits this user input to WHUD 400. Control ring 401 could for example be one of the rings disclosed in U.S. Provisional Patent Application Ser. No. 62/607,816, U.S. Provisional Patent Application Ser. No. 62/607,819, or U.S. Provisional Patent Application Ser. No. 62/671,248. FIG. 4B shows a WHUD 410 having a user input mechanism 411 carried directly thereon. User input mechanism 411 can include for example a joystick, a button, buttons, or a touch-sensitive area, among any other type of input mechanism as appropriate for a given application. Further, user input could also be provided by a gesture recognition system, such as an EMG armband, which reads electrical signals in the arm of a user, and determines user gestures based on the electrical signals. Exemplary EMG armband and gesture identification systems are described in at least U.S. Pat. Nos. 9,299,248, 9,367,139, 9,389,694. Further still, user input in the context of the present systems, devices, and methods can also be provided via speech commands captured by microphone 111 in FIG. 1.

Providing Interaction Assistance

For convenience, discussion throughout this application points specifically to the features of WHUD 100, but one skilled in the art will appreciate that the discussion is also fully applicable to WHUD 300 and the corresponding features thereof, or to any other suitable device which could be used to achieve the features herein. For example, the discussion herein frequently refers to the at least one processor 120 of WHUD 100, but the present systems, devices, and methods could also be implemented on a WHUD system in which some or all of the processing is performed by a processor on a separate device, such as is shown and discussed above with reference to FIG. 3AA. As another example, the discussion herein frequently refers to microphone 111 of WHUD 100, but the present systems, devices, and methods could also utilize a microphone on a peripheral device such as shown in FIG. 3AB.

With reference to the method of FIG. 2, determining whether a user is interacting with another human, as in act 202, determines whether to present interaction assistance to the user. If the at least one processor 120 determines that the user is not interacting with another human, method 200 proceeds to act 203, not providing interaction assistance to a user of WHUD 100. If, however, the at least one processor 120 determines in act 202 that the user is interacting with another human, method 200 proceeds to act 204, providing interaction assistance to the user of WHUD 100. Several examples of interaction assistance provided in act 204 are described in detail below and are illustrated in FIGS. 5A-5C, 6A-6E, 7A-7C, 8A, 8B, 9A-9C, 10A-10C, 11A-11C, 12A, 12B, 13, and 14A-14D. For illustrative purposes, the hardware referred to below with regards to FIGS. 5A-5C, 6A-6E, 7A-7C, 8A, 8B, 9A-9C, 10A-10C, 11A-11C, 12A, 12B, 13, and 14A-14D corresponds to the WHUD 100 shown in FIG. 1. However, one skilled in the art will appreciate that the present systems, devices, and methods can be implemented on any suitable hardware arrangement as is appropriate for a given application.

Figure 5A:
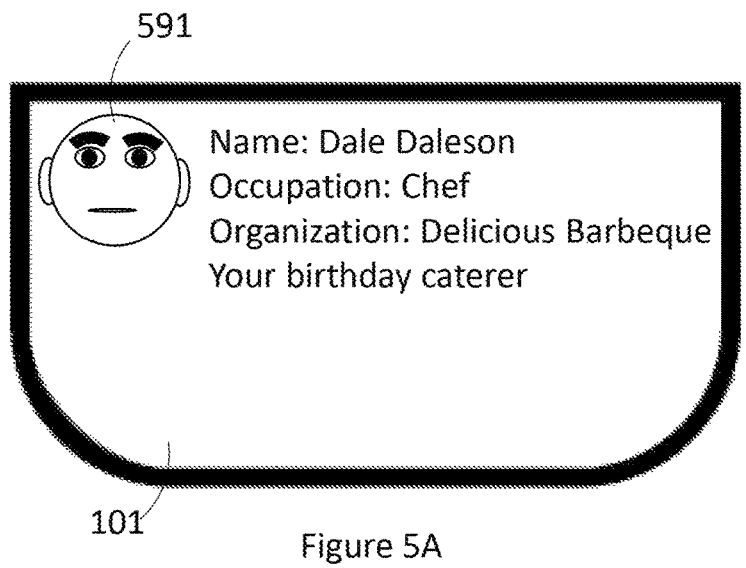
FIGS. 5A, 5B, and 5C illustrate exemplary user interfaces in which interaction assistance is provided to a user based on the identity another human with whom the user is interacting, according to at least three illustrated implementations.
Figure 5B:
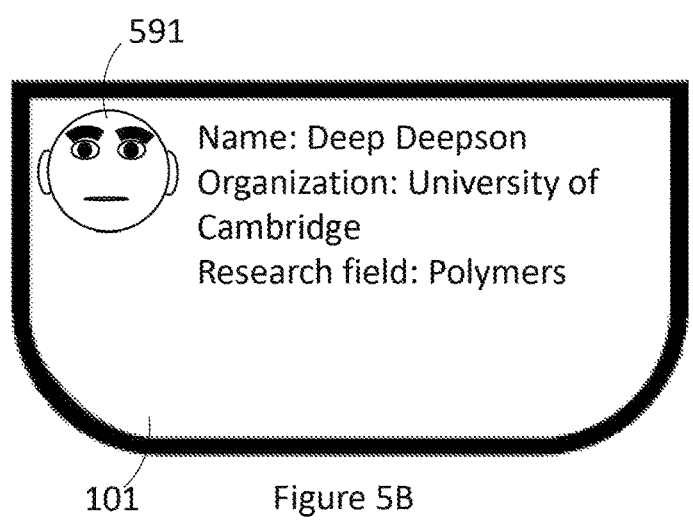
Figure 5C:
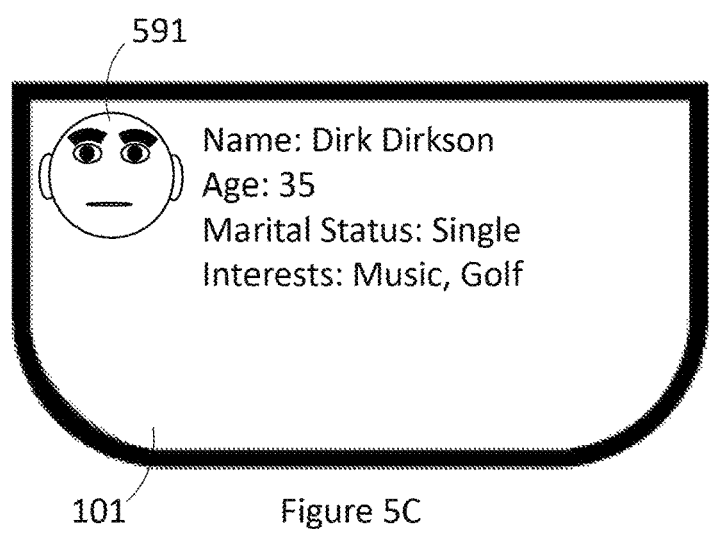

FIGS. 5A-5C illustrate exemplary user interfaces presented in implementations in which the at least one processor 120 first identifies another human 591 with which the user is interacting, and subsequently provides interaction assistance to a user based on the identity of the other human 591. In the below implementations, and in many other implementations in this specification, data is captured which may include representations of other humans, such as visual representations of the other human's appearance and/or audio representations of their voice. For ethical, moral, and legal reasons, considerations for the privacy of other humans can be implemented. In one example, external feedback can be provided which informs other humans that they are being recorded and/or analyzed. As examples, at least one light indicator such as a flashing light, and/or an audio indicator such as a beep or camera shutter sound can be output by a WHUD when data which might include another human is being captured, so as to be clearly perceptible by other humans. Functionality could be provided which allows the other human to immediately decline to be recorded. For example, at least one processor 120 of a WHUD 100 may be capturing audio data, and another human may say "I don't want to be recorded". In response, the at least one processor 120 may immediately cease recording activities and delete any recently recorded data and/or any recent analysis results which may include identifying information. As one example, the at least one processor 120 may immediately disable all sensors and delete all data captured by all sensors in the last 10 minutes. As another example, the at least one processor 120 may immediately cease capturing visual data and audio data, and delete any recorded visual or audio data, but the at least one processor 120 may continue to capture and record user motion data from an IMU 113, since this user motion data will not contain any information which identifies another human. Deletion of data could be based on defined time frames such as 1 minute, 5 minutes, or 10 minutes (for example), but could also involve the at least one processor 120 analyzing the captured data to determine when the interaction started, and delete data from the time at which the interaction started. Additionally, the WHUD 100 could provide feedback to other humans indicating that recording has ceased and data has been deleted. For example, a speaker of the WHUD 100 may announce "Recording stopped; recorded data deleted."

Figure 9A:
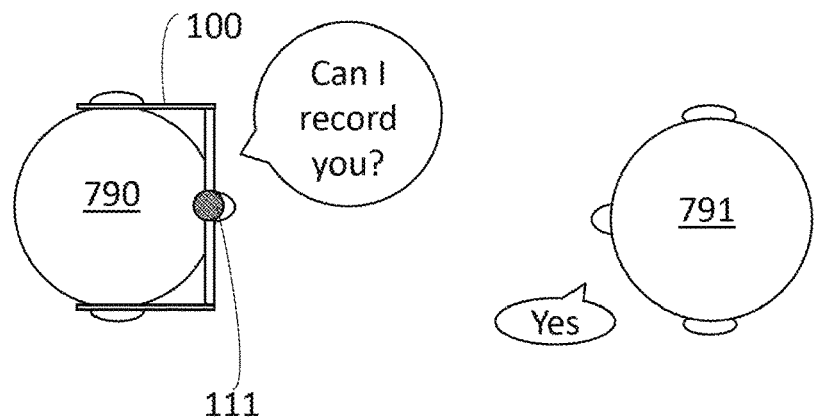
FIGS. 9A, 9B, and 9C illustrate exemplary situations in which interaction assistance can be provided to a user by allowing the user to record and store interactions, according to at least two illustrated implementations.

Additionally, identification of other humans could be deliberately limited to only those who have previously given explicit consent, such as humans who have signed up to be included in an identification database as will be discussed in more detail below. In some implementations, explicit consent may be required before substantive data capture can commence. For example, a microphone 111 of a WHUD 100 may be listening for very specific cues, such as the user asking "May I record you?". The microphone could then listen for a consenting response such as "Yes" or "Okay". Such an implementation is shown in FIG. 9A and discussed later. Further, when data is captured which includes a representation of another human and/or private/personal information, this data and any analysis results based on the data can be encrypted to prevent unauthorized third party access.

Another human 591 could be identified by the at least one processor 120 in a number of different ways, including the examples discussed below.

As one example, captured visual data from camera 112 including a representation of the face of the other human 591 can be analyzed. This could include the at least one processor 120 using a face matching algorithm to compare the facial features of the other human 591 to a known database of human faces. Such a known database of human faces could include profile pictures in a database of the user's contacts stored on processor-readable non-transitory medium 121, or stored remotely such as on cloud storage accessible to WHUD 100. Alternatively, the captured visual data may be sent to a remote device or server on which a database of known human faces is stored, and at least one remote processor could compare the representation of the face of the other human 591 to the database of known human faces. Further, the known database of faces does not need to be limited to including the user's contacts, but could include anyone whose picture is available for analysis, though this may be subject to privacy considerations as discussed below. For example, at least one processor (on WHUD 100 or remote from WHUD 100) could compare a representation of the other human's face in the captured visual data to known faces in a database of known faces. Social networks such as Facebook® could be leveraged to access a great number of known human faces. Comparison of the representation of the face of the other human 591 to known faces could include comparing facial features of the other human to facial features of known faces, such facial features including for example eyebrow shape, eyebrow color, eyebrow positions, hair color, hair position, eye shape, eye color, cheek shape, jaw shape, ear shape, ear position, nose shape, nose position, neck shape, or any other appropriate facial feature.

However, even if a database or dataset of known faces is publicly available such as through a social network, in the interests of privacy such a public database may not be used, or comparison to the known database may be limited to comparison with faces of people who have explicitly consented to such analysis. In one example, an independent database of known faces could be constructed, where each person stored in the database has explicitly consented to have their facial data used for analysis. In another example, an existing social network could establish an opt-in service, where users who opt in can have their facial data included in a database of known faces for comparison.

As another example, captured audio data from microphone 111 including a representation of the other human's voice can be analyzed. This could include the at least one processor 120 using a voice matching algorithm to compare the other human's voice pattern to a database or dataset of known voice patterns. Such a known database of voice patterns could include vocal profiles in a database of the user's contacts stored on processor-readable non-transitory medium 121, or stored remotely such as on cloud storage accessible to WHUD 100. Alternatively, the captured audio data may be sent to a remote device or server on which a database of known voice patterns is stored, and at least one remote processor could compare the representation of the other voice to the database of known voice patterns. Further, the known database of voice patterns does not need to be limited to including the user's contacts, but could include anyone whose voice is available for analysis, though this may be subject to similar privacy considerations as discussed above. For example, at least one processor (on WHUD 100 or remote from WHUD 100) could compare a representation of the other human's voice in the captured audio data to known vocal patterns in a database of known voices. Social networks such as Facebook® could be leveraged to access a great number of known human voices. Comparison of the representation of the voice of the other human 591 to known voice patterns could include comparing vocal features of the other human 591 to vocal features of known voices, such vocal features including for example frequency spectrum, frequency pattern, volume spectrum, volume pattern, regional accent, communication vernacular, language, or any other appropriate vocal feature.

However, similar to as discussed above, even if a database or dataset of known voice patterns is publicly available such as through a social network, in the interests of privacy such a public database may not be used, or comparison to the known database or dataset may be limited to comparison with voice patterns of people who have explicitly consented to such analysis. In one example similar to above, an independent database of known voice patterns could be constructed, where each person stored in the database has explicitly consented to have their vocal data used for analysis. In another example similar to above, an existing social network could establish an opt-in service, where users who opt in can have their vocal data included in a database or dataset of known voice patterns for comparison.

Once the other human is identified, biographic data coupled to the other human's identity can be retrieved by the at least one processor 120. For example, if the other human is identified as being one of the user's contacts, biographic data stored for the contact can be retrieved. Such stored information could include the other human's name, job title, organization memberships, relationship to the user, age, marital status, telephone number, email address, social network handles, or any other appropriate information. As another example, if the other human is identified based on an external database, biographic data for the other human can be retrieved from the external database or dataset. Social networks such as Facebook® could be leveraged to access a great deal of biographic information, such as at least the other human's name, job title, organization memberships, work field, research field, relationship to the user, age, marital status, telephone number, email address, social network handles, hobbies, interests, political views, or any other appropriate information, though the available information may be subject to privacy concerns discussed below. Further, it is within the scope of the subject systems, devices, and method to retrieve biographic data of another human from a plurality of sources. For example, another human 591 might be identified based on data stored in a user's contact database, but additional biographic data not stored in the user's contact database could be retrieved from an external database or dataset such as one or more social networks.

Regardless of the source of the biographic information, explicit consent may be required in order to display any given biographic information. For example, even if another human has registered to a database or dataset for facial or vocal comparison as discussed above, they may choose to limit the available information. For example, one person may limit their available biographic information such that only their name, job title, and organization are available.

In the examples illustrated in FIGS. 5A-5C, providing interaction assistance to the user comprises presenting biographical data regarding the other human 591 with which the user is interacting.

In the example of FIG. 5A, a display 101 of a WHUD 100 presents a picture of the other human 591, a name of the other human ("Dale Daleson"), a job title of the other human ("Chef"), a name of at least one organization or group which the other human is a member of ("Delicious Barbeque"), and a description of the relationship between the user and the other human ("Your birthday caterer"). This implementation is particularly valuable for cases where the other human 591 is known to the user, but the user may have forgotten some important details about the other human 591. The WHUD 100 can thus present biographic data to help the user remember important details to avoid awkward situations, such as the other human 591 realizing that the user has forgotten their name.

In the example of FIG. 5B, a number of humans may have signed up to attend a research conference, and may have signed up to have their facial and/or vocal data analyzed for comparison and identification purposes as detailed above. Further, they may have provided information which they wish to be available to other humans attending the conference. This information could be stored in a database or dataset, which may be restricted such that only other attendees of the conference have access. In FIG. 5B, a display 101 of a WHUD 100 presents a picture of the other human 591, a name of the other human ("Deep Deepson"), and organization of the other human ("University of Cambridge"), and a research field of the other human ("Polymers"). This could be useful for helping the conference attendees meet other researchers and make social connections.

In the example of FIG. 5C, a display 101 of a WHUD 100 presents a picture of the other human 591, a name of the other human ("Dirk Dirkson"), an age of the other person ("35"), a marital status of the other human ("Single"), and interests of the other human ("Music, Golf"). This implementation is particularly valuable when the other human 591 is not known to the user. In such a case, information about the other human 591 can be retrieved from an external database or dataset to quickly provide the user more details about who they are interacting with. In an exemplary implementation, a number of humans sign up for a new social network, in which they provide their facial and/or vocal data, and consent to having said data available for analysis and comparison, along with some biographical information which they want to be publicly available. When a user who is signed up to the social network interacts with another human, facial data of the other human can be compared to facial data of other humans signed up for the social network, and if the other human is signed up for the social network, their biographical data could be presented to the user. An exemplary use for this implementation could be if the user is currently seeking friends and/or a potential partner or partners for intimate relationships. In such a case, with information such as that shown in FIG. 5C, a user may quickly discern that Dirk Dirkson is of appropriate age, is single (not married), and has similar interests to the user, and thus may be a suitable spouse. If the user interacts with a person who does not meet their criteria, such as if they have vastly different interests, they may choose to quickly move to another person who may be more suitable. Thus the present systems, devices, and methods could provide an efficient means for relationship finding.

The above implementations could present any appropriate biographical information in any appropriate fashion. As one example, all of the information illustrated in FIGS. 5A-5C could be presented together on a single display. As another example, all of the information illustrated in FIGS. 5A-5C could be presented sequentially on the display, such that a single piece of information (or a subset of the information) is presented at one time, and the other pieces of information are presented subsequently. Such a sequential display could present each new piece of information after a certain time interval, or could present each new piece of information each time a user provides an input to the WHUD 100. Such an input could be designated as any received user input, or could be designated as a specific input (such as pressing the right key on a control ring). Further, the biographical information need not be presented via display 101, but could also be presented by other output devices, such as speaker 102. In such a case, the at least one processor 120 can use a text-to-speech algorithm or program to convert the text-based information to at least one audio signal. Alternatively, the at least one processor 120 could simply retrieve the biographical data directly as at least one audio file.

Figures 6A, 6B:
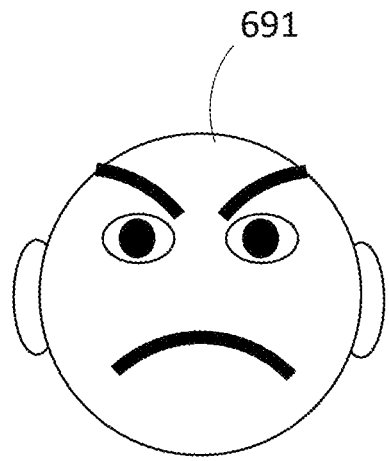

FIGS. 6A-6E illustrate implementations in which interaction assistance can be provided to a user 690 based on an emotional state of user 690 and/or an emotional state of another human 691 with whom user 690 is interacting. "Emotional state" as used herein refers to the emotions which a human is feeling at a given time. Such emotions will often be shown through a human's face, in a human's voice, and on a human's body, such that other entities (like other humans, or the present systems, devices, and methods) can understand the human's emotional state. In the example of FIG. 6A, the other human 691 may be angry. The at least one processor 120 of a WHUD 100 worn by user 690 may identify that the other human 691 is angry, and provide interaction assistance to help user 690 appropriately interact with the other human 691 given their emotional state of anger. Though FIG. 6A illustrates the other human 691 as being angry, it is within the scope of the present systems, devices, and methods to provide interaction assistance based on any identified emotional state of the other human 691.

An emotional state of the other human 691 can be identified using techniques described above with regards to FIGS. 3K to 3L, such as at least one processor 120 analyzing captured visual data from camera 112 which includes a representation of the other human 691 to identify at least one facial expression of the other human 691. Analysis of whether the other human 691 is making an emotional facial expression can be based on at least one of an eye shape of the other human 691, eyebrow shape and eyebrow position of the other human 691, eyelid movement patterns of the other human 691, mouth shape and mouth position of the other human 691, and any other suitable characteristic as appropriate for a given application. For example, as shown in FIG. 6A, when the eyebrows of the other human 691 are slanted downwards from the outside edge of the face towards the nose, this can be an indicator that the user is angry. Further, when the mouth of the other human 691 forms a frowning shape, this can be another indicator that the other human 691 is angry. The at least one processor 120 can compare the shape of any number of facial features against facial features represented in a database of known emotional states (stored either locally on non-transitory processor-readable medium 121 or on an external device or server) to determine an emotional state of the other human 691. Further, the at least one processor 120 can analyze a plurality of facial features in combination to more accurately determine an emotional state of the other human 691, using any of the techniques discussed above regarding combining properties of user context data, such as a checklist, a threshold list, or confidence scoring as non-limiting examples.

Additionally, an emotional state of the other human 691 can be identified based on captured audio data from microphone 111 which includes a representation of the voice of the other human 691, as discussed above with regards to FIG. 3B. For example, the at least one processor of a WHUD worn by user 690 can analyze a vocal expression of the other human 691 by analyzing at least a volume of the voice of the other human 691, a frequency or frequency patterns of the voice of the other human 691, rate of speech of the other human 691, or any other appropriate feature of the voice of the other human 691 represented in the captured audio data. "Vocal expression" as used herein can be considered as a similar term to "facial expression", but with reference to a human's voice rather than a human's face. That is, "vocal expression" can be considered as characteristics of a human's voice which are indicative of their feelings or emotional state. As one example, if the at least one processor 120 identifies that the other human 691 is speaking with loud volume (such as when shouting), speaking at a low frequency, and speaking quickly, the at least one processor 120 may determine that the emotional state of the other human 691 is angry. As another example, if the at least one processor 120 identifies that the other human 691 is speaking with a low volume, at a high frequency, and speaking slowly, the at least one processor 120 may determine that the emotional state of the other human 691 is sad. The at least one processor 120 can analyze a plurality of vocal features in combination to more accurately determine an emotional state of the other human 691, using any of the techniques discussed above regarding combining properties of user context data, such as a checklist, a threshold list, or confidence scoring as non-limiting examples.

It is within the scope of the present systems, devices, and methods for the at least one processor 120 to determine an emotional state of the user based on both captured audio data from a microphone 111 and captured visual data from a camera 112, as well as captured data from any other user context sensor, using any of the techniques discussed above regarding combining properties of user context data, such as a checklist, a threshold list, or confidence scoring as non-limiting examples.

In response to determining the emotional state of the other human 691, WHUD 100 may present interaction assistance to help the user 690 understand the emotions of the other human 691, and optionally may present suggestions for how to interact with the other human 691 appropriately. An example user interface is shown in FIG. 6B, in which a user is informed that the emotional state of the other human 691 is angry, and is presented with some suggestions for appropriately interacting with the other human 691.

In addition to identifying an emotional state of the other human 691, the emotional state of user 690 can also be identified, to provide appropriate interaction assistance. FIGS. 6C-6E illustrate an exemplary implementation in this regard. FIGS. 6C and 6D illustrate an exemplary situation in which there is a significant difference between an emotional state of the user 690 and an emotional state of the other human 691. In the exemplary situation, a user 690 has an emotional state of energetic and happy, whereas the other human 691 has an emotional state of angry. This anger could be caused by the actions of user 690, and the user 690 may be completely unaware of the impact their actions are having on the other human 691. Many humans have difficulty interpreting facial expressions and body language made by other humans, which may lead to the situation of FIGS. 6C and 6D. The present systems, devices, and methods can provide interaction assistance to help remedy or avoid a situation like that in FIGS. 6C and 6D.

An emotional state of the user 690 can be identified using similar techniques to those discussed above with regards to FIGS. 6A and 6B, and/or using at least techniques described above with regards to FIGS. 3U-3Z discussed above. As examples shown in FIGS. 3U and 3V, the at least one processor 120 can analyze captured user eye data provided by eye tracking system 114 in order to identify an emotional facial expression of user 690, based on at least one of eye shape of at least one of the user's eyes, eyebrow shape and position of at least one of the user's eyebrows, eyelid movement patterns of at least one of the user's eyelids, or any other suitable characteristic as appropriate for a given application. For example, when the eyebrows of user 690 are raised, this is indicative that the user 690 may be happy. As another example, FIGS. 3W and 3X show cases where the irises of the user 390 are in different states of dilation. Generally, dilation of a human's irises will increase when the human is in a state of emotional arousal, which can indicate that the user 690 may be excited, surprised, scared, thrilled, or happy for example. As another example, FIGS. 3Y and 3Z show an implementation where WHUD 300 includes a plurality of proximity sensors 315a, 315b, 315c, and 315d which can measure the distance between a portion of the user's face and the WHUD 300, in order to determine facial expressions made by the user. Specifically, when a user makes different facial expressions, the user's cheeks tend to raise, lower, or change shape depending on the facial expression, and the user's eyebrows tend to raise, lower, or change angle and shape depending on the facial expression. Each of the proximity sensors can measure a distance between the WHUD 300 and a feature on the user's face, in order to determine a facial expression made by the user. In the example of FIGS. 3Y and 3Z, proximity sensor 315*a* measures the distance between the top of WHUD 300 and the user's right eyebrow, proximity sensor 315*b* measures the distance between the top of WHUD 300 and the user's left eyebrow, proximity sensor 315*c* measures the distance between the bottom of WHUD 300 and the user's right cheek, and proximity sensor 315*d* measures the difference between the bottom of WHUD 300 and the user's left cheek. In the example shown in FIG. 3Z, the at least one processor can determine that the user is smiling if the proximity sensors 315*a* and 315*b* indicate that the user's eyebrows are raised away from the top of the WHUD and if the proximity sensors 315*c* and 315*d* indicate that the user's cheeks are raised towards WHUD 300. Determining that the user is smiling can be indicative that the user has a happy emotional state. The at least one processor 120 can compare the shape of any number of facial features of user 690 against facial features represented in a database of known emotional states (stored either locally on non-transitory processor-readable medium 121 or on an external device or server) to determine an emotional state of the user 690. Further, the at least one processor 120 can analyze a plurality of facial features in combination to more accurately determine an emotional state of the user 690, using any of the techniques discussed above regarding combining properties of user context data, such as a checklist, a threshold list, or confidence scoring as non-limiting examples.

Additionally, the emotional state of user 690 can also be identified by analyzing captured audio data which includes a representation of the voice of user 690, using the techniques discussed above with regards to FIGS. 6A and 6B.

Additionally, the emotional state of user 690 can also be identified by analyzing user context data from external sensors, such as a heart rate monitor. For example, if a heart rate sensor provides user context data indicating that the heart rate of user 690 is high, this can mean that the user 690 is in a state of heightened emotion, such as elation or anger. Similarly, if the heart rate of the user 690 is low, this can indicate that the user 690 is in a low-energy emotional state, such as calm or depressed.

After determining an emotional state of the user 690 and the other human 691, the at least one processor 120 can determine a difference between the emotional state of user 690 and the emotional state of the other human 691.

In one implementation, this could be achieved by using defined categories of emotional state, and detecting whether the emotional state of user 690 is in a different category from the emotional state of the other human 691. In one example, categories of emotional state could be defined broadly as "Happy", "Sad", "Angry", or "Neutral", and each of the emotional state of the user 690 and the emotional state of the other human 691 could be classified into one of the defined categories. Subsequently, the at least one processor 120 could determine whether the emotional state of user 690 is in the same category as the emotional state of the other human 691, and provide interaction assistance to the user 690 if the emotional state of user 690 is not in the same category as the emotional state of the other human 691. This example could include any number of other categories of emotional state, including for example "Excited", "Jubilant", "Focused", "Thoughtful", "Hopeful", "Bored", "Surprised", "Scared", "Frustrated", "Annoyed", "Melancholic", "Flustered", "Confused", "Panicked", "Flabbergasted", or any other appropriate emotional category.

In another implementation, emotional state categories similar to those above could be defined, but instead determining a single category for the emotional state of user 690 and a single category for the emotional state of the other human 691, the at least one processor 120 could generate a score for how strongly the user context data indicates that the emotional state of each human falls within each defined category. Subsequently, the score for each category could be compared for the user 690 and the other human 691, and interaction assistance could be provided if a combined difference exceeds a threshold. Such a combined difference could be based on total difference in each category, or average difference between all emotional categories, for example. Certain emotional categories could be weighted higher than others, for example a strong difference in the "Happy" category may have significantly more weight in determining how best to provide interaction assistance than a strong difference in the "Neutral" category. Alternatively or additionally, the provided interaction assistance could be based on what category or categories of emotions differ the most between the user 690 and the other human 691.

In another implementation, the at least one processor 120 could directly compare the facial expression and/or vocal expression of user 690 to the facial expression and/or vocal expression of the other human 691 to determine a level of difference between the emotional state of the user 690 and the emotional state of the other human 691. The at least one processor 120 could for example compare the shape of individual facial features of user 690 to the shape of individual facial features of the other human 691 to generate a similarity score which indicates a level of similarity between a facial expression of user 690 and a facial expression of the other human 691. Similar analysis could be performed on the vocal expression of user 690 and the vocal expression of the other human 691. Based on the comparison, if the facial expression and/or vocal expression of user 690 and the other human 691 are significantly different (for example if a similarity score is below a threshold), the at least one processor 120 may determine that interaction assistance should be provided to user 690.

FIG. 6E illustrates a display 101 of a WHUD which provides exemplary interaction assistance to user 690 in the situation of FIGS. 6C and 6D. The interaction assistance includes informing the user 690 about the difference in their emotional state compared to the emotional state of the other human 691, provides an explanation of how this could be problematic, and provides a suggestion to optimize the interaction.

Although FIGS. 6B and 6E show the interaction assistance as being displayed on display 101, it is within the scope of the present systems, device, and methods that the interaction assistance be presented as audio through another output device such as speaker 102. In such a case, the at least one processor can use a text-to-speech algorithm or program to convert text-based interaction assistance to at least one audio signal. Alternatively, the at least one processor could generate interaction assistance directly as at least one audio signal.

Figure 7A:
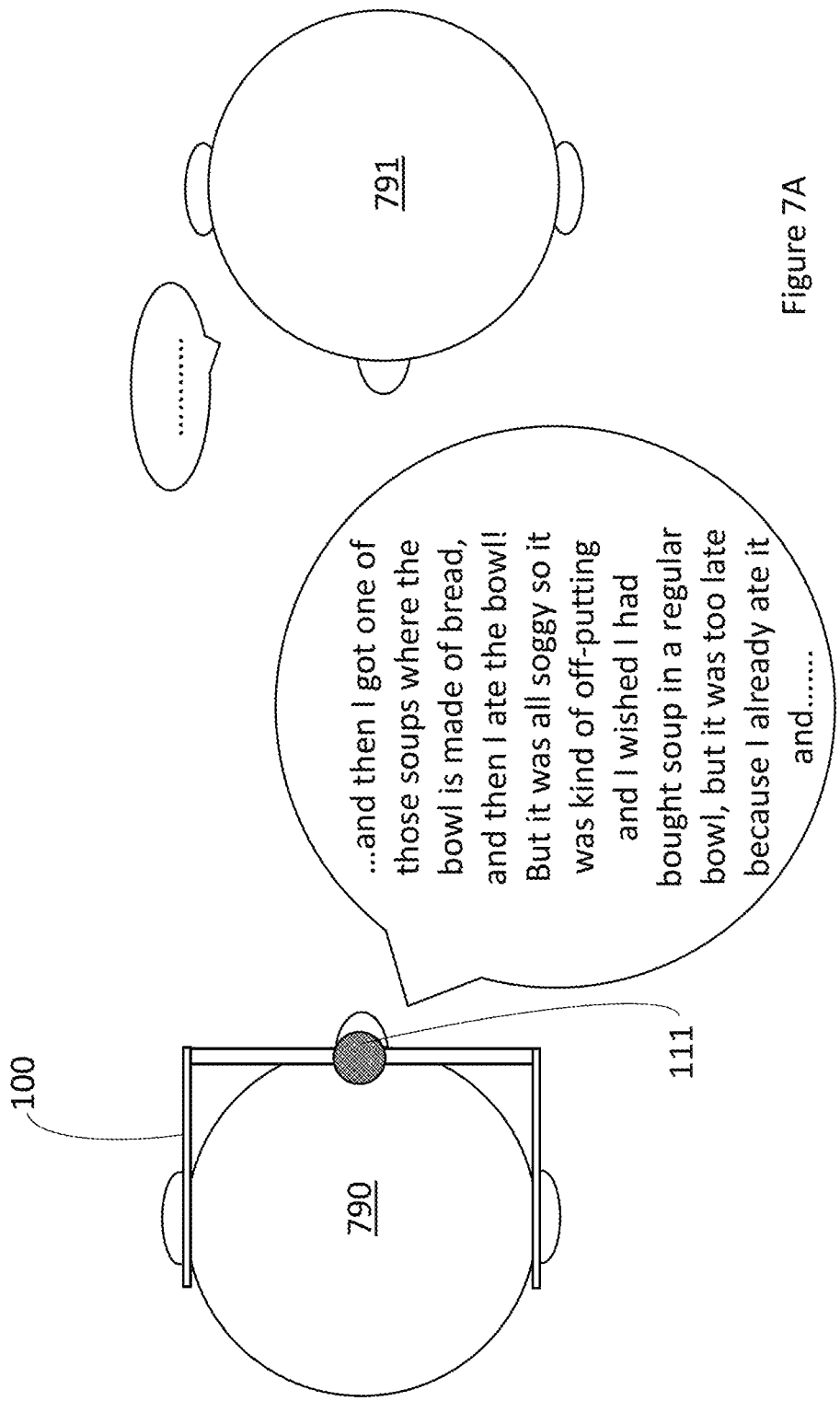

The present systems, devices and methods can also provide interaction assistance to a user when the user is dominating an interaction, as illustrated in FIGS. 7A and 7B. FIG. 7A illustrates an exemplary situation in which a user 790 is talking extensively at another human 791 about a mundane and uninteresting topic, will little to no engagement from the other human 791. This type of situation can be unpleasant for both parties, because the other human 791 will become bored of user 790 over time and may even start avoiding them if this scenario happens regularly. Thus, it would be helpful to notify user 790 that they are dominating the interaction and optionally provide suggestions for how to proceed with the interaction.

At least one processor 120 of a WHUD 100 worn by user 790 can determine whether user 790 is dominating an interaction in many ways.

As one example, a microphone 111 could capture audio data, and the at least one processor 120 could analyze the captured audio data to determine a proportion of time in which a voice of user 790 is represented in the captured audio data. This could be accomplished by analyzing the captured audio data to identify frequencies, a frequency spectrum, and/or frequency patterns which are typically representative of the voice of user 790. Alternatively, microphone 111 could include a user-facing microphone which captures primarily noise originating from the user's mouth, such that the majority of substantial audio signals captured by the user-facing microphone will correspond to noise generated by the user 790 speaking.

Additionally, microphone 111 could also capture audio data representing noise such as the other human 791 speaking. This could be accomplished by the at least one processor 120 analyzing the captured audio data to identify frequencies, a frequency spectrum, and/or frequency patterns which are typically representative of a human voice, but different from the frequencies, frequency spectrum, and/or frequency patterns which represent the voice of user 790. In a case where microphone 111 includes a user-facing microphone which captures primarily noise originating from the user's mouth, microphone 111 could also include a world-facing microphone which captures audio representative of noise generated in the world, such as the other human 791 speaking. Consequently, captured audio data from the user-facing microphone could be used to determine when user 790 is speaking, and captured audio data from the world-facing microphone could be used to determine when the other human 791 is speaking.

Additionally or alternatively, captured visual data from a camera on WHUD 100 may be used to determine when the other human 791 is speaking. For example, the at least one processor 120 may analyze captured visual data from the camera containing a representation of the other human 791 to determine when the other human 791 is moving their lips.

By analyzing when user 790 is talking and optionally when the other human 791 is talking, the at least one processor 120 can determine a proportion of the interaction for which each human is talking, and optionally a difference between the proportion of time during which user 790 is talking and the proportion of time during which the other human 791 is talking. For example, the at least one processor 120 could determine that user 790 is talking 90% of the time. Even without determining when the other human 791 is talking, it is clear that the user is talking almost all of the time and is thus dominating the interaction. The WHUD 100 may thus provide interaction assistance to the user. As another example, the at least one processor 120 could determine that the user 790 is talking 45% of the time, the other human is talking 45% of the time, and no one is talking 10% of the time. The at least one processor 120 could subsequently determine that since the user 790 and the other human 791 are talking for equal proportions of time, there is not need to provide interaction assistance. As another example, the at least one processor 120 could determine that the user 790 is talking 65% of the time, the other human is talking 15% of the time, and no one is talking 20% of the time. Consequently, the at least one processor 120 could determine that the user 790 is dominating the interaction, and interaction assistance should be provided.

Upon determining that interaction assistance should be provided, interaction assistance can be presented to the user via display 101 as illustrated in FIG. 7B, or via an alternative output device such as speaker 102 similarly to as discussed above. Such interaction assistance could include a notification informing the user 790 that they are dominating the conversation. Optionally, suggestions for how to proceed with the interaction could be presented as illustrated in FIG. 7B. In the example of FIG. 7B, a number of suggested questions are presented, so that the user 790 can select a question and ask the other human 791, in order to elicit engagement from the other human 791 and refocus the interaction towards the other human 791.

In certain implementations, it can be helpful to provide interaction assistance when the user 790 is being dominated in an interaction. As an example, the at least one processor 120 may determine that the other human 791 is talking 90% of the time and the user 790 is only talking 5% of the time, and no one is talking the remaining 5% of the time. Subsequently, the at least one processor 120 may determine that interaction assistance should be provided informing the user that they are not engaging with the other human 791, and optionally providing suggestions for how to proceed with the interaction.

In certain implementations, it can be helpful to provide interaction assistance not only when either the user 790 or the other human 791 is talking too much, but also when neither of the user 790 and other human 791 are talking enough, i.e., there are lengthy pauses in the conversation, or there is no conversation at all. For example, the at least one processor 120 may determine that the user is talking 0% of the time, the other human is talking 15% of the time, and no one is talking 85% of the time. Subsequently, the at least one processor 120 may determine that interaction assistance should be provided. An example of this is shown in FIG. 7C, in which a number of candidate conversation topics are presented to user 790 via a display 101. Similar to as discussed previously, this interaction assistance can be provided via other output devices than display 101, such as speaker 102 for example. Further, such candidate conversation topics are not limited to being presented in response to determining when a user 790 and other human 791 are not talking very much, but can also be presented at other appropriate times. For example, when a user 790 and other human 791 initiate an interaction, the at least one processor 120 may determine that an interaction has started, and provide interaction assistance in the form of providing candidate conversation starter topics to help kick off the conversation before user 790 and the other human 791 end up in an awkward silence.

In certain implementations, the at least one processor 120 can also determine an emotional state of the user 790 and/or the other human 791 as detailed above regarding FIGS. 6A-6E, in order to determine whether interaction assistance should be provided, and to determine what interaction assistance to provide. As an example, even if the at least one processor 120 determines that user 790 is talking 95% of the time, but the other human 791 has a focused and/or interested emotional state, the at least one processor 120 may decide not to provide interaction assistance, since the other human 791 seems to be engaged with what user 790 is talking about. User 790 could just be telling a long but interesting story, for example. As another example, if the at least one processor 120 determines that the emotional state of the other human 791 is sad, the interaction assistance provided may focus on happier topics, in order to attempt to uplift the other human 791.

Monitoring user context data to determine a proportion of time during which the user 790 is talking and optionally a proportion of time during which the other human 791 is talking can be performed continuously, such that the user context sensors are continuously providing user context data to the at least processor 120 for analysis. This could consume significant amounts of power however. Alternatively, the monitoring could be performed periodically, such that intermittent samples of user context data are captured at periodic intervals, similarly to as detailed previously. As an example, microphone 111 could activate every 10 seconds to capture a 1 second sample of audio data. The at least one processor 120 could analyze each captured 1 second sample of audio data to determine whether user 790 is talking or optionally whether the other human 791 is talking. If the at least one processor 120 determines that the user 790 was talking for a number of samples in a row, for example 10 samples, the at least one processor 120 may determine that the user 790 has been talking for a long time, and provide interaction assistance informing the user of such. As another example, the at least one processor 120 could determine that, over a long period of time, the user 790 was talking for a high percentage of the samples, e.g. 80%. The at least one processor 120 could subsequently determine that interaction assistance should be provided informing the user that they are dominating the conversation. Similar sampling strategies to those discussed above could also be applied to determining a proportion of time in which the other human 791 is talking. Further, besides microphone 111, any appropriate user context sensors could be used to determine when the user 790 or the other human 791 are talking, including at least camera 112, IMU 113, eye-tracking system 114, and proximity sensors 115, for example.

One skilled in the art will appreciate that the above mentioned numerical proportions, sample lengths and sample intervals are merely illustrative, and any appropriate numerical proportions, thresholds, sample lengths and sample intervals could be selected as appropriate for a given application.

Figure 8A:
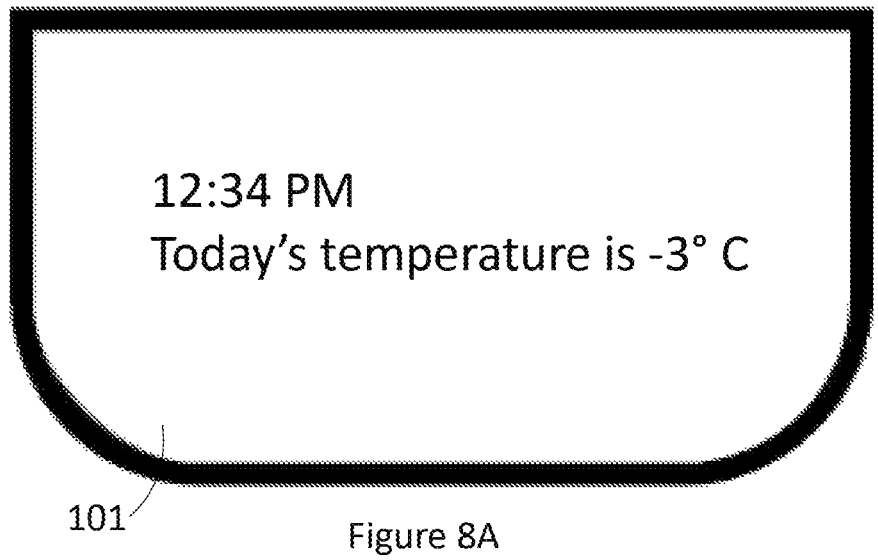
FIGS. 8A and 8B illustrate exemplary user interfaces in which interaction assistance can be provided to a user by adjusting a size, position, or presentation format of content of a user interface when the user is interacting with another human, according to at least one illustrated implementation.
Figure 8B:
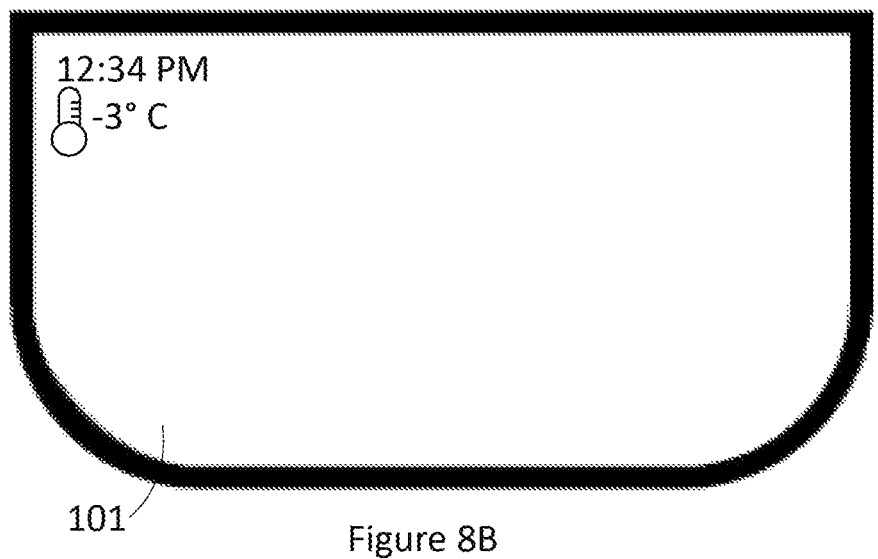

The subject systems, devices, and methods may also provide interaction assistance by modifying a user interface to be less obtrusive when a user is interacting with another human, as illustrated in FIGS. 8A and 8B. FIG. 8A illustrates a user interface which is large and positioned in the center of a display 101, as might be the case before at least one processor 120 determines that a user is interacting with another human. FIG. 8B illustrates a modified user interface, which has been reduced in size and repositioned so as to be in the periphery of the user's field of view. After determining that the user is interacting with another human, the at least one processor 120 may modify at least one user interface from large and in the center of the user's field of view as in FIG. 8A to small and in the periphery of the user's field of view as in FIG. 8B. It is within the scope of the present systems, devices, and methods that only one of the size or position of at least one user interface be modified, or both of the size and position of at least one user interface to be modified.

Additionally, a convenient visual summary representative of displayed content can be displayed instead of the full content, such as the thermometer image of FIG. 8B in place of "Today's temperature is:", to reduce the obtrusiveness of displayed content. Exemplary systems, devices, and methods for generating visual summaries are described in at least U.S. Provisional Patent Application No. 62/577,081.

Additionally, in certain implementations, after determining that the user is interacting with another human, the at least one processor 120 may reduce the brightness of at least one user interface. In certain implementations, after determining that the user is interacting with another human, the at least one processor 120 may disable presentation of at least one user interface entirely.

Figure 9B:
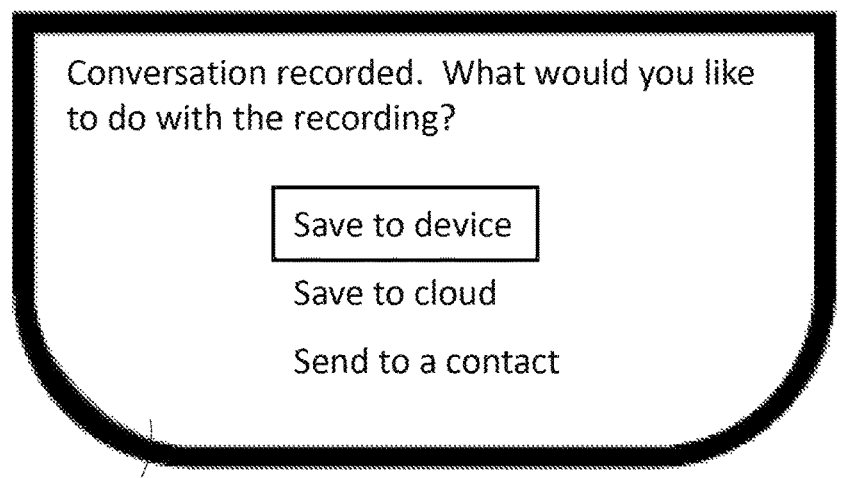
Figure 9C:
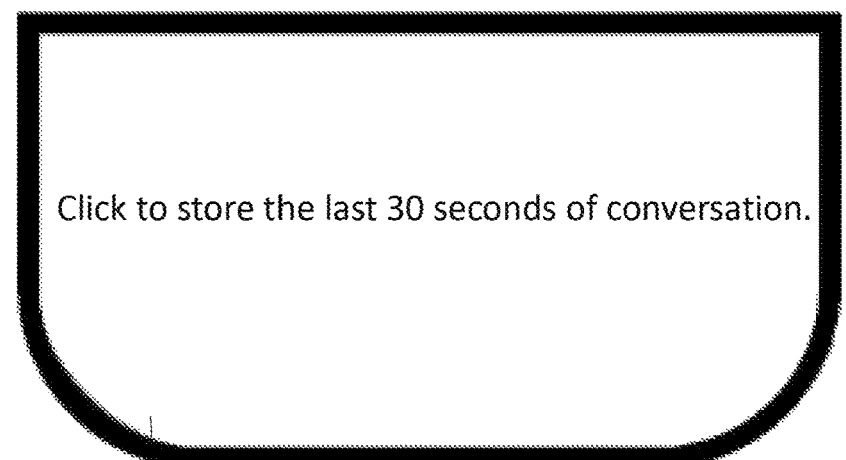

The subject systems, devices, and methods may also provide interaction assistance by recording interactions as detailed regarding FIGS. 9A-9C. After at least one processor 120 determines that a user of a WHUD system 100 is interacting with another human, the at least one processor 120 may cause any of the user context sensors on WHUD 100 to begin recording the interaction. For example, microphone 111 and/or camera 112 may record the interaction. Prior to recording, the WHUD 100 may present a user interface option to the user allowing the user to choose whether or not to record the interaction. Alternatively, recording of interactions could be performed automatically without explicit user instruction. However, in the discussed implementations, and in many other implementations in this specification, data is captured which may include representations of other humans, such as visual representations of the other human's appearance and/or audio representations of their voice. For ethical, moral, and legal reasons, considerations for the privacy of other humans can be implemented. In one example, external feedback can be provided which informs other humans that they are being recorded. As examples, at least one light indicator such as a flashing light, and/or an audio indicator such as a beep or camera shutter sound can be output by a WHUD when data including another human is being captured, so as to be clearly perceptible by other humans. Functionality could be provided which allows the other human to immediately decline to be recorded. For example, at least one processor 120 of a WHUD 100 may be capturing audio data, and another human may say "I don't want to be recorded". In response, the at least one processor 120 may immediately cease recording activities and delete any recently recorded data and/or any recent analysis results which may include identifying information. As one example, the at least one processor 120 may immediately disable all sensors and delete all data captured by all sensors in the last 10 minutes. As another example, the at least one processor 120 may immediately cease capturing visual data and audio data, and delete any recorded visual or audio data, but the at least one processor 120 may continue to capture and record user motion data from an IMU 113, since this user motion data will not contain any information which identifies another human. Deletion of data could be based on defined time frames such as 1 minute, 5 minutes, or 10 minutes (for example), but could also involve the at least one processor analyzing the captured data to determine when the interaction started and deleting data from the time at which the interaction started. Additionally, the WHUD 100 could provide feedback to other humans indicating that recording has ceased and data has been deleted. For example, a speaker of the WHUD 100 may announce "Recording stopped; recorded data deleted."

Additionally, recording of other humans could be deliberately limited to only those who have previously given explicit consent. In one example, a factory may put in place policies which record human-to-human interactions, to ensure that safety protocols and communication standards are being met. In such a case, recording may begin when an interaction begins, even without explicit instruction from a user. All employees of the factory may be required to explicitly indicate their consent for such recording in their employment agreement, for example. In other implementations, explicit consent from a human being recorded may be required before substantive data capture can commence. For example, a microphone 111 of a WHUD 100 may be listening for specific cues, such as the user asking "May I record you?". The microphone could then listen for a consenting response such as "Yes" or "Okay", and in response a camera 112 could begin capturing visual data. Such an implementation is shown in FIG. 9A. Further, when data is captured which includes a representation of another human and/or private/personal information, this data and any analysis results based on the data can be encrypted to prevent unauthorized third party access.

In one implementation illustrated in FIG. 9B, when the interaction begins, any time during the interaction, or after the interaction has ended, the WHUD 100 may present a user interface option to the user to store the recorded interaction. Such a user interface option could include a binary choice of whether or not the recording should be stored for future user. Additionally or alternatively, the WHUD 100 may present a user interface option to the user to choose a location to store the recording as shown in FIG. 9B. As examples, the recording could be stored locally on the non-transitory processor-readable storage medium 121 of WHUD 100, or the recording could be transmitted to a remote storage location, such as an external server or cloud storage system. In certain implementations, a user interface option may be presented to the user to transmit the recording to another party, such as to a contact, co-worker, friend, family member, or any other recipient which may be relevant.

In another implementation illustrated in FIG. 9C, recording an interaction may comprise continuously capturing a buffer recording of the interaction, which can be a recording which only keeps a short duration of the most recent portion of the interaction. During the interaction, providing interaction assistance may comprise the WHUD 100 providing a user interface option to the user to store the current content of the buffer recording. For example, the buffer recording may keep only the most recent 30 seconds of the interaction, and the WHUD 100 may provide a user interface option to the user to store the portion of the interaction currently in the buffer recording. This could be particularly useful for storing an important piece of the conversation, such as for example if an important date or task is said. By maintaining a buffer recording, a user advantageously can decide to store important information after the information has been said, such that a user is not required to predict when important information will be said beforehand. One skilled in the art will appreciate that a buffer length of 30 seconds is merely exemplary, and any buffer length could be used as appropriate for a given application. The user interface option to store the content of the buffer recording could be presented as a selectable item on display 101, or could be a hotkey or command indicated by a message on display 101 as illustrated in FIG. 9C. In certain implementations, the user interface option to store the content of the buffer recording may be a hotkey or command available to the user, but not explicitly presented by the WHUD 100. For example, the WHUD 100 may store the buffer recording when the user presses any key on an input device during an interaction, even without an instruction being presented on display 101 as shown in FIG. 9C. As another example, the WHUD 100 may store the buffer recording when the user presses a specific key (e.g., a right press on a directional pad) on an input device during an interaction.

The recording and buffer recording detailed above could be captured by any appropriate user context sensors, including microphone 111, camera 112, IMU 113, eye tracking system 114, and proximity sensors 115. Further, any plurality of user context sensors could together capture the above recording or buffer recording. As one example, microphone 111 and camera 112 could both capture a recording.

The subject systems, devices, and methods may also provide interaction assistance by generating or gathering information based on at least one interaction, as illustrated in FIGS. 10A-10C. These implementations are particularly helpful for quickly summarizing or preparing brief notes about an interaction, so that the user does not need to review a recording of the interaction in detail to extract important information later. Further, these implementations could be helpful at preventing issues like voyeurism, by preventing the user from having direct access to actual interaction recordings, while still providing useful functionality of storing the important concepts or key points of an interaction.

In one example, when the at least one processor 120 determines that the user of a WHUD 100 is interacting with another human, a microphone 111 of the WHUD 100 could capture audio data of the interaction. Subsequently, the at least one processor 120 can analyze the content of the captured audio data to identify what is being said, in order to generate helpful notes for the user. In the example illustrated in FIG. 10A, the at least one processor 120 analyzes the content of the captured audio data and generates a summary of the key points of the conversation. For example, an employee may be discussing a project with their supervisor, and the at least one processor 120 could generate a number of useful notes, included at least any deadlines, schedules, tasks, issues, problems or information discussed during the interaction. In the example of FIG. 10B, the at least one processor 120 analyzes the content of the captured audio data and populates a grocery list based on the content of the captured audio data. For example, a couple may be discussing what groceries they need for the evening, and the at least one processor 120 could recognize each item in the conversation and populate a grocery list.

Each of the examples discussed with reference to FIGS. 10A and 10B can be performed in real time, such that the at least one processor 120 generates or populates the information in time with the interaction, and optionally presents the information to the user during the interaction. This advantageously allows the user to see and confirm the generated information in real-time. However, it may be advantageous for the microphone 111 to first record the interaction, and the at least one processor 120 to analyze the recording of the interaction after the interaction is over. Such an implementation advantageously is less demanding of processing resources because the at least one processor 120 does not need to keep up with the conversation. Further, the at least one processor 120 can perform a more thorough analysis which can take into account not only the words being spoken in real-time, but also subsequent words, which enables more informed contextual analysis.

Any of the summaries, notes, or lists generated above could be stored as a separate file or could be added to an existing file. For example, an independent file could be created for each interaction a user has with their boss and stored with date and time stamps. As another example, when the at least one processor 120 determines that the user is discussing groceries to buy, the at least one processor 120 could open an existing grocery list, and new items could be added to the existing grocery list.

In another example, when the at least one processor 120 determines that the user of a WHUD 100 is interacting with another human, a microphone 111 of the WHUD 100 could capture audio data of the interaction. Subsequently, the at least one processor 120 can analyze the content of the captured audio data to determine and parse words being spoken, to prepare a transcript of the conversation. As illustrated in FIG. 10C, the generated transcript can be presented to the user in real-time via display 101, in order to help the user follow the conversation. This is particularly helpful for people who have difficulties hearing, as the content of the conversation can be presented in an alternative format which does not depend on sound. Further, presenting a transcript can also be helpful to people who struggle to understand and keep up with a conversation, such as people learning a new language, because an additional form of communication is presented to reinforce and/or clarify what the user is hearing.

Optionally, the generated transcript could be stored for later review. Further, similar to above, the microphone 111 could first record the interaction, and the at least one processor 120 could generate a transcript of the interaction after the interaction is over, so that the user may review the transcript in the future.

Figure 11A:
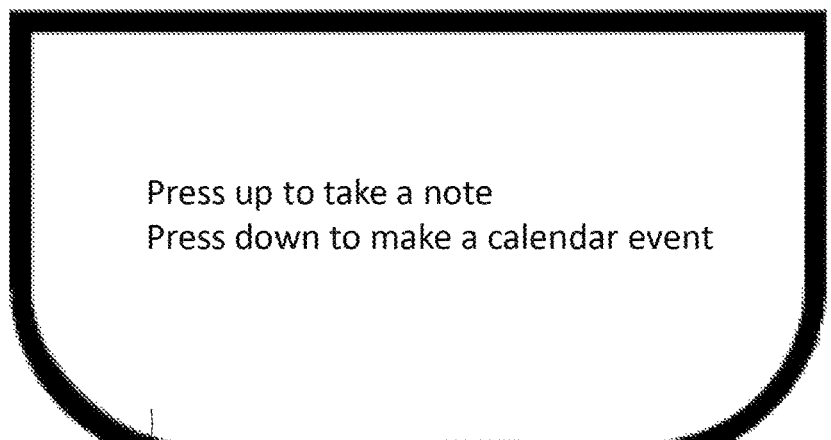
FIGS. 11A, 11B, and 11C illustrate exemplary user interfaces for allowing the user to take notes or input events during or after an interaction with another human, according to at least three illustrated implementations.
Figure 11B:
Figure 11C:
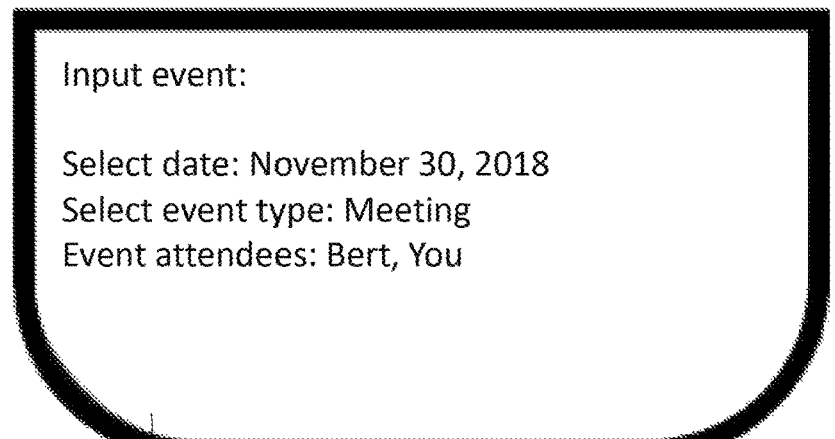

The subject systems, devices, and methods may also provide interaction assistance by allowing the user to create notes or events, as illustrated in FIGS. 11A-11C.

In one example, when the at least one processor 120 determines that the user of a WHUD 100 is interacting with another human, WHUD 100 may provide a user interface option for the user to input a note or create a calendar event. For example, as illustrated in FIG. 11A, a user interface option can be presented which allows a user to select whether to input a note or make an event. FIG. 11B illustrates an exemplary case where a user has selected to input a note, and a user interface is presented requesting a note to be input. In the case of FIG. 11B, the note can be provided as a vocal statement from the user captured by microphone 111. However, in other implementations, a note could be generated by other input means such as a peripheral text entry device as a non-limiting example. Further, a note could be automatically generated by the at least one processor 120 based on the user's usage history and the content of the interaction. For example, at least one microphone 111 can capture audio data including audio of the interaction, and subsequently the at least one processor could generate key summary items similarly to as in FIG. 10A. Subsequently, the WHUD 100 could present a user interface option for the user to select any number of key items which should be stored as a note. FIG. 11C illustrates an exemplary case wherein a user has selected to make a calendar event. A user interface is presented in which a user may provide information for a number of parameters, including for example date, time, event type, and event attendees. Subsequently, and event can be created based on the input from the user.

Figure 12A:
FIGS. 12A and 12B illustrate exemplary user interfaces in which notifications to be presented to a user while the user is interacting with another human can be delayed, and presented to the user after the interaction is over.
Figure 12B:

The subject systems, devices, and methods may also provide interaction assistance by first disabling or limiting notifications presented to a user when the user is interacting with another human, and preparing a list of items or tasks based on the notifications that were disabled or limited, for presentation to the user once the interaction is over. As one example illustrated in FIG. 12A, a user is interacting with another human, and during the interaction, the user's friend Dalila sent the user a message, the user's boss Gertrude called the user, and the user's coworker Dan reschedule a meeting with the user. In this example, the at least one processor 120 disables the above items from being presented to the user while the user is interacting with the other human, and generates a list of items for presentation to the user after the interaction is over. In the case of FIG. 12A, a quick summary of items is presented after the interaction is over for the user's review. Such a summary could present the items in chronological order according to when the notification was to be presented to the user. Alternatively, the at least one processor 120 could analyze the content of each notification and prioritize and/or group notifications according to importance, urgency, and source, among any other criteria as appropriate for a given application. In the example of FIG. 12B, notifications are sorted according to work related and other, since work related items will often have higher priority than non-work related items. However, explicit labelling of categories as in FIG. 12B is not necessary. Instead, the at least one processor could simply organize a list of items order from highest priority to lowest priority. Beyond just the source of the notification, the at least one processor 120 could analyze the content of and details associated with the notification to determine priority. As one example, one of the notifications shown in FIGS. 12A and 12B related to the user's coworker Dan rescheduling a meeting with the user. If the meeting was or is now scheduled to commence shortly, such as in ten minutes, the at least one processor 120 could assign a high priority to this notification. On the other hand, if the meeting was or is now scheduled to commence in a week, the at least one processor 120 may assign a low priority to this notification.

Any of the above options could be controlled by user settings, including explicit settings determined by the user, as well as implicit settings learned by the at least one processor 120 over time. For example, the user could have set all work-related notifications to be of high priority. As another example, when the at least one processor 120 presents notifications to the user, the user may immediately handle non-work related notifications first, and delay handling of work-related notifications until later. The at least one processor 120 may learn this behavior and assign higher priority to non-work-related notifications.

FIGS. 13 and 14A-14D illustrate exemplary techniques for determining a priority level of a notification, as could be implemented in the systems, devices, and methods of FIGS. 12A and 12B for example.

Figure 13:
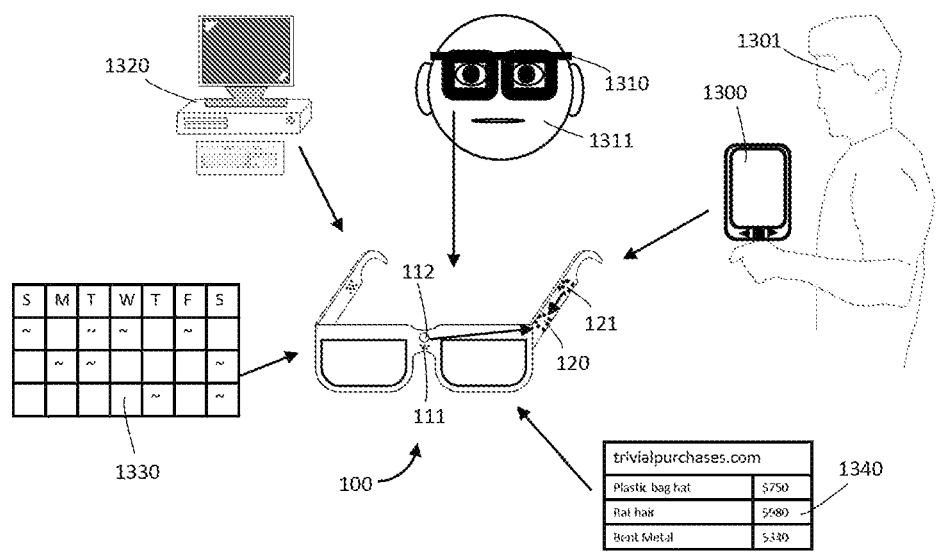
FIG. 13 is a schematic diagram that shows several exemplary sources of notification content which can be used to determine a priority level of at least one notification, according to at least seven illustrated implementations.

FIG. 13 illustrates several sources of content of the at least one notification, which enables determining, by the at least one processor 120, a source of content of the at least one notification, and determining, by the at least one processor 120, a priority level of the notification based on the source of content of the at least one notification. FIG. 13 includes remote device 1300 associated with remote user 1301, such that the at least one processor 120 can determine priority level of content of at least one notification based on the remote device 1300 and/or the remote user 1301 associated with remote device 1301. For example, if remote device 1300 is a device which is unfamiliar to WHUD 100, and/or the remote user 1301 of remote device 1300 is unknown to WHUD 100, the at least one processor 120 may determine that content of at least one notification received from the remote device 1300 should have a low priority level. On the other hand, if WHUD 100 recognizes remote device 1300 and/or remote user 1301 as an important contact of the user of WHUD 100, the at least one processor 120 may determine that content of at least one notification received from remote device 1300 should be high priority. FIG. 13 also illustrates remote WHUD 1310 associated with remote user 1311, for which the same discussion as regarding remote device 1300 and remote user 1301 applies, but the remote device is a WHUD. FIG. 13 also illustrates a remote computer 1320, to illustrate that content of at least one notification can come from sources other than portable electronic devices, but can also come from home computers, laptops, and servers, among any other suitable content source, as appropriate for a given application. FIG. 13 also illustrates a calendar 1330, which may include scheduled events for the user of WHUD 100. Calendar 1330 can be stored on non-transitory processor readable medium 121 of WHUD 100, or can be stored external to WHUD 100, such as on a remote server. Calendar 1330 can provide content of at least one notification to WHUD 100, and the at least one processor 120 can determine that content of notifications from calendar 1330 are either high priority or low priority, depending on the settings of the calendar and the user's preferences. Further, content of notifications from calendar 1330 can be determined as having different priority levels depending on the nature of the content. As an example, the at least one processor 120 may determine that meetings with the user's boss or clients are always high priority, but may determine that scheduled breaks and tea parties are low priority. FIG. 13 also illustrates a website 1340, which can provide content of at least one notification to the user of WHUD 100. The at least one processor 120 may determine that content of notifications from website 1340 are either low or high priority, depending on the settings of the website, the user's preferences, and the nature of the content of the at least one notification. For example, the at least one processor 120 may determine that promotional notifications from the website, such as advertisements of new products, are in general low priority. However, the user could set notifications regarding a specific product as high priority, should they want to act the moment the product is available. In addition, a source of content of at least one notification does not need to be external to WHUD 100, but rather content of notifications can be generated internally, such as from the operating system of WHUD 100, software which runs on WHUD 100, and/or sensors carried by WHUD 100. As examples, the at least one processor 120 could generate content of at least one notification based on a battery level of WHUD 100, available storage capacity of WHUD 100, available random access memory (RAM) of WHUD 100, available processing capacity of the at least one processor 120, temperature of WHUD 100, and any other suitable information stored on non-transitory processor readable medium 121, received by sensors of WHUD 100, or otherwise available to WHUD 100, as appropriate for a given application.

Figure 14A:
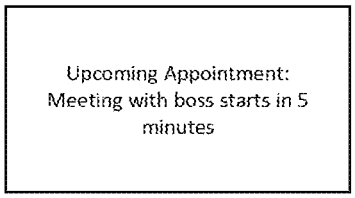
FIGS. 14A, 14B, 14C, and 14D are plan views that respectively show several examples of notification content which can be used to determine a priority level of at least one notification, according to at least four illustrated implementations.
Figure 14B:
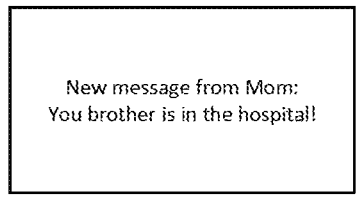
Figure 14C:
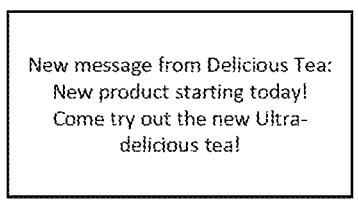
Figure 14D:
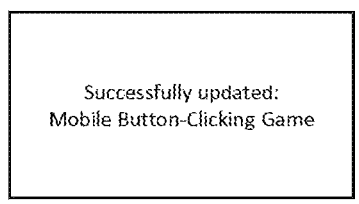

FIGS. 14A-14D illustrate several example notifications, from which the at least one processor 120 can analyze the content of the notification to determine a priority level of the notification. FIGS. 14A-14B show notifications which the at least one processor 120 may analyze the content of, in order to determine that the notifications are of high priority, whereas FIGS. 14C-14D show notifications which the at least one processor 120 may analyze the content of, in order to determine that the notification are of low priority.

Regarding FIG. 14A, the source of the notification is a calendar of the user of WHUD 100, in which the user has a meeting with their boss scheduled in 5 minutes. The at least one processor 120 may determine that the content of a notification is high priority based on any or all of at least: the nature of the notification, other people relevant to the notification, time restrictions related to the notification, and/or any other suitable information related to the calendar. In this case, the nature of the notification is a meeting reminder (i.e., important to ensure that the user is not late), other people relevant to the notification includes the user's boss (i.e., an important person), and time restrictions related to the notification include a start time in 5 minutes (i.e., imminent). Because all of these factors point to the notification being important, the at least one processor 120 may determine that the content of the notification of FIG. 14A is high priority. However, one skilled in the art will appreciate that all of the above factors do not need to indicate that the content of the notification is important in order for the at least one processor 120 to determine that the content of the notification is high priority. Rather, if a single property of the content of the notification is found to be important, the at least one processor 120 may determine that the content of the at least one notification is high priority. Similarly, a threshold number of properties indicating that the content of the notification is important could cause the at least one processor 120 to determine that the content of the at least one notification is high priority. Alternatively, a confidence score could be utilized in which each of the properties relating to the importance of the content of the at least one notification are weighted against each other to produce a confidence score which indicates the level of confidence the at least one processor has that the content of the at least one notification is high priority. One skilled in the art will appreciate that the techniques and features related to determining a confidence score discussed above regarding combining properties of user context data are also fully applicable to determining confidence scores for analysis of content of at least one notification.

Regarding FIG. 14B, the source of the notification is a mother of the user of WHUD 100, and the content of the notification is a message which says "Your brother is in the hospital!". The at least one processor 120 may determine that since the source of the message is a known contact of the user, and the content of the message is of an urgent nature, the notification is high priority. An analysis of the content of the notification can include searching for keywords in the content, like "hospital", "injury", or "serious", for example, and searching for subjects in the content which are related to the user, such as "brother", "father", or "Bob" in a case where the user has a known contact named Bob. One skilled in the art will appreciate that the above examples of keywords to search for are merely exemplary, and that any suitable keywords could be used as appropriate for a given application. Further, any suitable analysis technique could also be applied to determine the importance of the content of the notification, as appropriate for a given application.

Regarding FIG. 14C, the source of the notification is a tea company called Delicious Tea, and the content of the notification is a message which says "New product starting today! Come try out the new Ultra-delicious tea!". The at least one processor 120 may determine that since the source of the message is not an important contact of the user, nor is the content of an urgent nature, the notification is low priority.

Regarding FIG. 14D, the source of the notification is an application installed on the device called "Mobile Button-Clicking Game", and the content of the notification is an alert which informs the user that Mobile Button-Clicking Game was successfully updated. The at least one processor 120 may determine that since the source of the content of the notification is a non-important game, and the content is of a non-urgent nature, the notification is low-priority.

Determining priority level of a notification can utilize at least one data structure, database or data store to provide data on which to base the determination. For example, a database could be utilized which stores crowdsourced user evaluations of notifications presented to users previously. Preferably, such a database would be connected to a large quantity of users, to maximize available data. With such a database, every time a notification is presented to a user, the user's reaction to the notification can be monitored and stored in the at least one database, such that the user's reaction can be utilized to inform future determinations about how similar notifications should be presented in the future. As an example, if a notification is presented as a high priority notification after the user finishes interacting with another human, but the user ignores the notification or proceeds to handle other notifications, the at least one database could store that the notification was improperly identified as high priority and presented to the user while the user was interacting with another human, but the notification should have been identified as low priority. Consequently, similar notification content in the future could be identified as low priority instead of high priority. Similarly, other reactions from the user could be monitored and stored, such as facial expressions made by the user before and after presentation of the notification, to determine whether the user responds positively or negatively to presentation of the notification. For example, if the user shows a happy emotion upon receiving the notification, it could indicate that the user is pleased to receive the notification and that the assigned priority level of the notification is appropriate. Alternatively, if the user shows an angry emotion, it could indicate that the user is unhappy to receive the notification, and that the determined priority level of the notification is inaccurate. Further, no reaction from the user can also be monitored and stored, which could indicate that the user ignored the notification because it is of low priority. The at least one database may also employ a voting and/or survey system, in which user's vote on, rate, or provide feedback regarding the quality of notification presentation and notification management. In one implementation, a machine learning algorithm is used to review user reactions to presented notifications, such that the machine learning algorithm gradually improves the presentation of notifications for all users.

Providing interaction assistance can also include managing presentation of a user's notifications, as detailed in U.S. Provisional Patent Application Ser. No. 62/714,489.

In some implementations, one or more optical fiber(s) may be used to guide light signals along some of the paths illustrated herein.

The devices described herein may include one or more on-board power sources (e.g., one or more battery(ies)), a wireless transceiver for sending/receiving wireless communications, and/or a tethered connector port for coupling to a computer and/or charging the one or more on-board power source(s).

The devices described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Non-Provisional patent application Ser. No. 15/282,535.

Throughout this specification and the appended claims the term "communicative" as in "communicative pathway," "communicative coupling," and in variants such as "com-municatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the following are incorporated by reference herein in their entirety: U.S. Non-Provisional patent application Ser. No. 15/145,576, U.S. Non-Provisional patent application Ser. No. 15/167,458, U.S. Non-Provisional patent application Ser. No. 15/046,254, U.S. Pat. Nos. 9,299,248, 9,367,139, 9,389,694, U.S. Non-Provisional patent application Ser. No. 14/155,087, U.S. Non-Provisional patent application Ser. No. 14/155,107, PCT Patent Application PCT/US2014/057029, U.S. Non-Provisional patent application Ser. No. 15/282,535, U.S. Provisional Patent Application No. 62/577,081, U.S. Provisional Patent Application Ser. No. 62/714,489, U.S. Provisional Patent Application Ser. No. 62/607,816, U.S. Provisional Patent Application Ser. No. 62/607,819, U.S. Provisional Patent Application Ser. No. 62/671,248, U.S. Non-Provisional patent application Ser. No. 15/167,458, U.S. Non-Provisional patent application Ser. No. 15/827,667, U.S. Provisional Patent Application Ser. No. 62/658,436, and U.S. Provisional Patent Application No. 62/782,921 Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
receiving, by at least one processor of a system for assisting human-to-human interactions, user context data from at least one user context sensor of the system;
determining, by the at least one processor, that a user is interacting with another human based on the user context data;
after determining, by the at least one processor, selecting at least one interaction assistance function from a plurality of interaction assistance functions, wherein the plurality of interaction assistance functions includes a function for presenting information to the user about the other human; and
providing interaction assistance to the user based on the at least one selected interaction assistance function.

2. The method of claim 1, wherein receiving the user context data from the at least one user context sensor comprises receiving at least one of:
captured audio data from a microphone included in the at least one user context sensor;
captured visual data from a camera included in the at least one user context sensor;
captured user eye data from a user eye-tracking system included in the at least one user context sensor; or
captured user motion data from an inertial measurement unit included in the at least one user context sensor.

3. The method of claim 1, the at least one user context sensor including at least one microphone, wherein:
receiving the user context data from the at least one user context sensor comprises receiving captured audio data from the at least one microphone; and
determining that the user is interacting with another human based on the user context data comprises:
analyzing at least one of a volume of the captured audio data, a source direction associated with the captured audio data, a source proximity associated with the captured audio data, a frequency spectrum of the captured audio data, emotion of a human represented in the captured audio data, or content of the captured audio data; and
determining that the user of the system is interacting with the other human based on one or a combination of the volume of the captured audio data, the source direction associated with the captured audio data, the source proximity associated with the captured audio data, the frequency spectrum of the captured audio data, the emotion of a human represented in the captured audio data, or the content of the captured audio data.

4. The method of claim 1, the at least one user context sensor including at least one camera, wherein:
receiving the user context data from the at least one user context sensor comprises receiving captured visual data from the at least one camera; and
determining that the user is interacting with the other human based on the user context data comprises:
determining that the other human is represented in the captured visual data;
identifying at least one of a proximity of the other human to the user, a gaze direction of the other human, a facial expression of the other human, or movement patterns of the other human based on the captured visual data; and
determining that the user is interacting with the other human based on one or a combination of the proximity of the other human to the user, the gaze direction of the other human, the facial expression of the other human, or the movement patterns of the other human.

5. The method of claim 1, wherein receiving the user context data from the at least one user context sensor comprises receiving at least two of:
captured audio data from a microphone included in the at least one user context sensor;
captured visual data from a camera included in the at least one user context sensor;
captured user eye data from a user eye-tracking system included in the at least one user context sensor; or captured user motion data from an inertial measurement unit included in the at least one user context sensor.

6. The method of claim 1, further comprising continuously capturing, by the at least one user context sensor, the user context data.

7. The method of claim 1, further comprising periodically capturing, by the at least one user context sensor, the user context data as intermittent user context data samples.

8. The method of claim 1, further comprising:
receiving, by the at least one processor, a user input to operate the system; and
capturing, by the at least one user context sensor, the user context data only after receiving, by the at least one processor, the user input to operate the system.

9. The method of claim 1 further comprising:
determining, by the at least one processor, an identity of the other human based on the user context data, and
wherein providing the interaction assistance to the user comprises presenting at least one of a name of the other human, a job title of the other human, a name of at least one organization or group which the other human is a member of, a work field of the other human, a research field of the other human, a description of a relationship between the user and the other human, an age of the other human, interests of the other human, or marital status of the other human.

10. The method of claim 1, further comprising:
determining an emotional state of the other human based on at least a portion of the user context data, and
wherein providing the interaction assistance to the user comprises presenting, to the user, information indicating the emotional state of the other human and suggestions to help the user interact with the other human.

11. The method of claim 1, further comprising:
determining a first proportion of time in which the user is talking within a time interval based on at least a portion of the user context data;
determining a second proportion of time in which the other human is talking within the time interval based on at least a portion of the user context data; and
determining a difference between the first proportion of time in which the user is talking and the second proportion of time in which the other human is talking,
wherein providing the interaction assistance to the user comprises presenting a notification to the user based on the difference between the first proportion of time in which the user is talking and the second proportion of time in which the other human is talking.

12. The method of claim 1, wherein providing the interaction assistance to the user comprises presenting candidate conversation topics to the user.

13. The method of claim 1, further comprising:
before determining that the user is interacting with the other human, presenting a user interface to the user at a first position on a display; and
after determining that the user is interacting with the other human, presenting the user interface at a second position on the display different from the first position.

14. The method of claim 1, wherein providing the interaction assistance to the user comprises capturing, by the at least one user context sensor, a recording of the interaction.

15. The method of claim 14, wherein capturing, by the at least one user context sensor, the recording of the interaction comprises continuously capturing a buffer recording of a portion of the interaction, and
wherein the providing the interaction assistance to the user comprises providing a user interface option to the user for storing the buffer recording of the interaction.

16. The method of claim 1, wherein providing the interaction assistance to the user comprises generating a summary of the interaction based on the user context data from the at least one user context sensor.

17. The method of claim 1, wherein providing the interaction assistance to the user comprises presenting a user interface to the user for taking notes.

18. The method of claim 1, further comprises:
while the user is interacting with the other human, receiving, by the at least one processor, content of at least two notifications to be presented to the user; and
generating, by the at least one processor, a list of notifications for the user based on the at least two notifications, the list of notifications to be presented to the user after the user is no longer interacting with the other human.

19. A method comprising:
receiving, by at least one processor of a system for assisting human-to-human interactions and from at least one user context sensor of the system, captured user motion data;
analyzing, by the at least one processor based on the captured user motion data, at least one of head motions made by a user, head position of the user, head angle of the user, or body motions made by the user based on the captured user motion data;
determining, by the at least one processor, that the user is interacting with another human based on one or a combination of at least one of the head motions made by the user, the head position of the user, the head angle of the user, or the body motions made by the user based on the captured user motion data; and
after determining that the user is interacting with another human, providing, by the at least one processor, interaction assistance to the user.

20. A method comprising:
receiving, by at least one processor of a system for assisting human-to-human interactions and from at least one user context sensor of the system, user context data including captured user eye data;
analyzing, by the at least one processor based on the captured user eye data, at least one of a blink frequency of a user, gaze direction of the user, movement patterns of at least one of the user's eyes, movement patterns of at least one of the user's eyelids, a facial expression of the user, or iris dilation patterns of at least one of the user's eyes;
determining, by the at least one processor, that the user is interacting with another human based on one or a combination of the blink frequency of the user, the gaze direction of the user, the movement patterns of at least one of the user's eyes, the movement patterns of at least one of the user's eyelids, the facial expression of the user, or the iris dilation patterns of at least one of the user's eyes based on the captured user eye data; and
after determining that the user is interacting with another human, providing, by the at least one processor, interaction assistance to the user.

* * * * *